United States Patent
Lee et al.

(10) Patent No.: US 8,340,041 B2
(45) Date of Patent: Dec. 25, 2012

(54) METHOD AND APPARATUS FOR ALLOCATING RANGING CHANNEL IN WIRELESS COMMUNICATION SYSTEM

(75) Inventors: Hyun Woo Lee, Seoul (KR); Han Gyu Cho, Seoul (KR); Jin Sam Kwak, Seoul (KR); Yeong Hyeon Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 285 days.

(21) Appl. No.: 12/829,344

(22) Filed: Jul. 1, 2010

(65) Prior Publication Data

US 2011/0002288 A1 Jan. 6, 2011

Related U.S. Application Data

(60) Provisional application No. 61/222,919, filed on Jul. 2, 2009, provisional application No. 61/225,287, filed on Jul. 14, 2009, provisional application No. 61/300,034, filed on Feb. 1, 2010, provisional application No. 61/301,206, filed on Feb. 4, 2010, provisional application No. 61/306,948, filed on Feb. 22, 2010.

(30) Foreign Application Priority Data

Jun. 9, 2010 (KR) .................. 10-2010-0054193

(51) Int. Cl.
*H04W 56/00* (2009.01)

(52) U.S. Cl. .................. 370/329; 370/350; 370/343

(58) Field of Classification Search .................. None
See application file for complete search history.

(56) References Cited

U.S. PATENT DOCUMENTS

| | | | | |
|---|---|---|---|---|
| 7,881,392 | B2* | 2/2011 | Li | 375/260 |
| 8,125,949 | B1* | 2/2012 | Dinan et al. | 370/329 |
| 8,159,979 | B2* | 4/2012 | Lee et al. | 370/280 |
| 2008/0144585 | A1* | 6/2008 | Stanwood et al. | 370/336 |
| 2010/0054233 | A1* | 3/2010 | Park et al. | 370/350 |
| 2010/0165931 | A1* | 7/2010 | Nimbalker et al. | 370/329 |
| 2010/0278123 | A1* | 11/2010 | Fong et al. | 370/329 |
| 2011/0019622 | A1* | 1/2011 | Lee et al. | 370/328 |
| 2011/0103406 | A1* | 5/2011 | Cai et al. | 370/480 |

* cited by examiner

*Primary Examiner* — Min Jung
(74) *Attorney, Agent, or Firm* — Lee, Hong, Degerman, Kang & Waimey

(57) ABSTRACT

A method and apparatus of allocating a ranging channel in a wireless communication system is provided. A base station (BS) allocates at least one first ranging channel, having a first structure, and at least one second ranging channel, having a second structure, to a ranging subframe. The first structure or the second structure can be one of the ranging channel structures of an IEEE 802.16e system. A number of orthogonal frequency division multiplexing (OFDM) symbols included in the first structure and a number of OFDM symbols included in the second structure differs from each other. And a guard time including at least one OFDM symbol is allocated between the at least one first ranging channel and the at least one second ranging channel.

19 Claims, 21 Drawing Sheets

METHOD AND APPARATUS FOR ALLOCATING RANGING CHANNEL IN WIRELESS COMMUNICATION SYSTEM

CROSS-REFERENCE TO RELATED APPLICATIONS

This application claims the benefit of U.S. Provisional Application No. 61/222,919 filed on Jul. 2, 2009, U.S. Provisional Application No. 61/225,287 filed on Jul. 14, 2009, U.S. Provisional Application No. 61/300,034 filed on Feb. 1, 2010, U.S. Provisional Application No. 61/301,206 filed on Feb. 4, 2010, and U.S. Provisional Application No. 61/306,948 filed on Feb. 22, 2010, and also claims the benefit of earlier filing date and right of priority to Korean Patent Application No. 10-2010-0054193 filed on Jun. 9, 2010, all of which are incorporated by reference herein in their entirety.

BACKGROUND OF THE INVENTION

1. Field of the Invention

The present invention relates to wireless communication and, more particularly, to a method and apparatus for allocating a ranging channel in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

An uplink control channel can be defined for transmission of an uplink control signal. Examples of the uplink control channel are various such as a fast feedback channel, a hybrid automatic repeat request (HARQ) feedback channel, a sounding channel, a ranging channel, a bandwidth request channel, etc. The fast feedback channel carries feedback of a channel quality indicator (CQI) and/or multiple-input multiple-output (MIMO) information, and can be classified into a primary fast feedback channel and a secondary fast feedback channel. The HARQ feedback channel is a channel for transmitting an acknowledgement (ACK)/non-acknowledgement (NACK) signal as a response for data transmission. The sounding channel can be used as an uplink channel response for closed-loop MIMO transmission and uplink scheduling. The bandwidth request channel is a channel for requesting a radio resource for transmitting a control signal or uplink data to be transmitted by a mobile station (MS).

The ranging channel can be used for uplink synchronization. The ranging channel can be classified into a ranging channel for a non-synchronized MS and a ranging channel for a synchronized MS. The ranging channel for the non-synchronized MS can be used for ranging on a target base station (BS) during initial network entry and handover. In a subframe in which the ranging channel for the non-synchronized MS is to be transmitted, the MS may not transmit any uplink burst or uplink control channel. The ranging channel for the synchronized MS can be used for periodic ranging. An MS which has already been synchronized with the target BS can transmit a ranging signal for the synchronized MS.

Meanwhile, an IEEE 802.16m system can support not only an MS supporting the IEEE 802.16m system, but also an MS supporting an IEEE 802.16e system because it has backward compatibility. A case in which the IEEE 802.16m system supports the 802.16e mobile station can be referred to as a legacy support mode.

In the legacy support mode, there is a need for a ranging channel structure for efficient ranging transmission.

SUMMARY OF THE INVENTION

It is, therefore, an object of the present invention to provide a method and apparatus for allocating a ranging channel in a wireless communication system.

In an aspect, a method of allocating a ranging channel in a wireless communication system is provided. The method include allocating at least one first ranging channel, having a first structure, and at least one second ranging channel, having a second structure, to a ranging subframe, wherein a number of orthogonal frequency division multiplexing (OFDM) symbols included in the first structure and a number of OFDM symbols included in the second structure differs from each other, and a guard time including at least one OFDM symbol is allocated between the at least one first ranging channel and the at least one second ranging channel. The first structure may include two contiguous OFDM symbols. An identical ranging code may be transmitted in the two contiguous OFDM symbols. The second structure may include one OFDM symbol. The at least one first ranging channel may be allocated to first to fourth OFDM symbols of the ranging subframe, and the at least one second ranging channel may be allocated to a last OFDM symbol of the ranging subframe. The method may further include a mobile station (MS) transmitting a ranging code to a base station (BS) through one of the at least one first ranging channel and the at least one second ranging channel. The ranging code may be transmitted through the at least one first ranging channel, and the ranging code may be one of an initial ranging code for initial network entry and association and a handover ranging code for ranging for a target BS during handover. Or, the ranging code may be transmitted through the at least one second ranging channel, and the ranging code may be for periodic ranging. The at least one first ranging channel or the at least one second ranging channel may include six distributed resource units (DRUs) in the frequency domain. The ranging subframe may include six OFDM symbols in the time domain.

In another aspect, an apparatus for allocating a ranging channel in a wireless communication system is provided. The apparatus include a processor configured to allocate at least one first ranging channel, having a first structure, and at least one second ranging channel, having a second structure, to a ranging subframe, and a radio frequency (RF) unit connected to the processor and configured to transmit a radio signal, wherein a number of orthogonal frequency division multiplexing (OFDM) symbols included in the first structure and a number of OFDM symbols included in the second structure differs from each other, and a guard time including at least one OFDM symbol is allocated between the at least one first ranging channel and the at least one second ranging channel. The first structure may include two contiguous OFDM symbols, and the second structure may include one OFDM symbol. The at least one first ranging channel may be allocated to first to fourth OFDM symbols of the ranging subframe, and the at least one second ranging channel may be allocated to a last OFDM symbol of the ranging subframe.

In another aspect, an uplink synchronization method in a wireless communication system is provided. The method include receiving a first ranging code from a first MS through at least one first ranging channel in a ranging subframe, receiving a second ranging code from a second MS through at least one second ranging channel in the ranging subframe, and performing uplink synchronization for each of the first MS and the second MS using the first ranging code and the second ranging code, wherein a guard time including at least one OFDM symbol is allocated between the at least one first ranging channel and the at least one second ranging channel. The first structure may include two contiguous OFDM symbols, and the second structure may include one OFDM symbol.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LET) is part of evolved UMTS (E-UMTS) using evolved-UMTS terrestrial radio access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16e.

Figure 1:
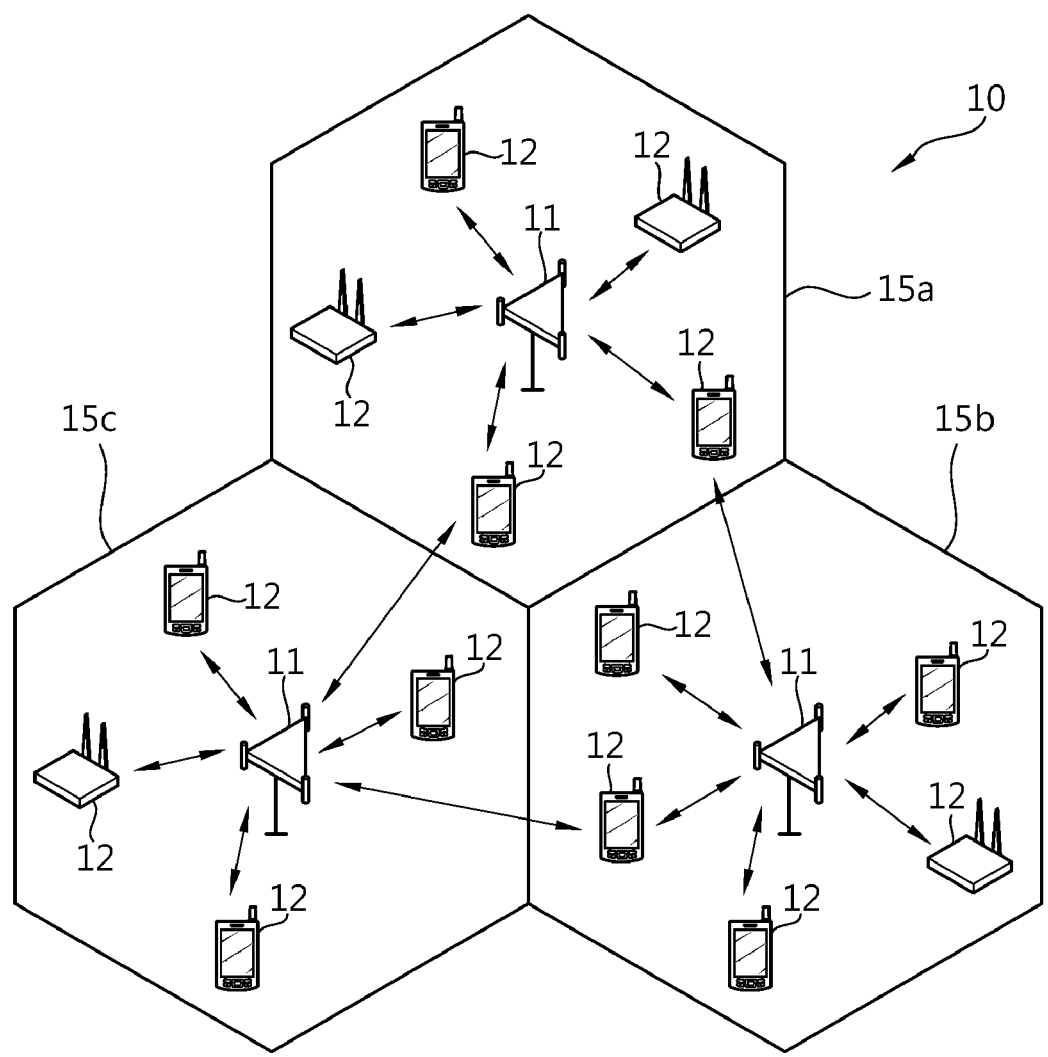
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
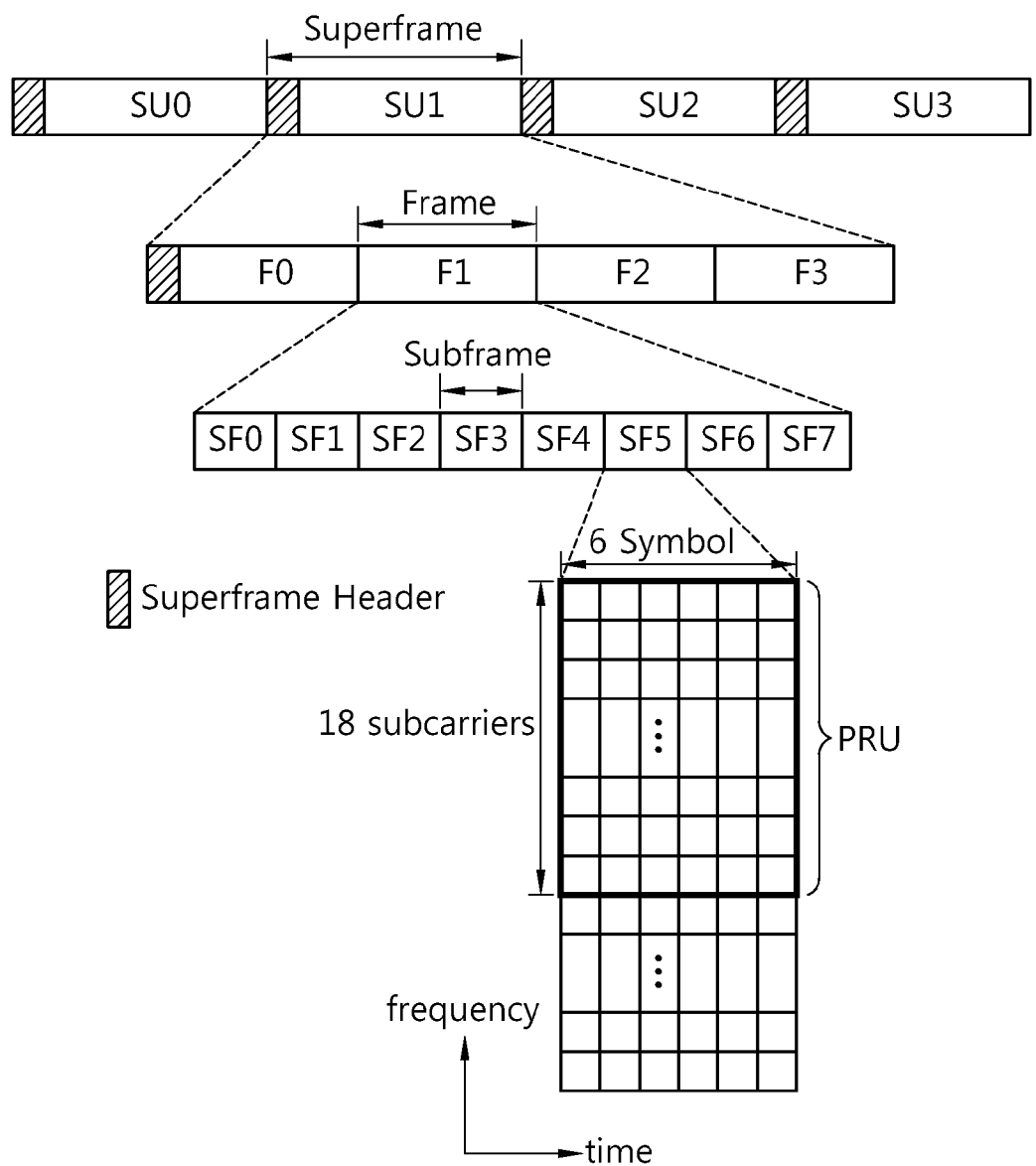
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

The SFH can carry an essential system parameter and system configuration information. The SFH may be located in a first subframe of the SF. The SFH can be classified into a primary-SFH (P-SFH) and a secondary-SFH (S-SFH). The P-SFH and the S-SFH may be transmitted in every superframe.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

One OFDM symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDM symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| Channel bandwidth, BW (MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, Fs (MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf (kHz) | | | 10.94 | 7.81 | 9.77 | 10.94 | 10.94 |
| Useful symbol time, Tb (μs) | | | 91.4 | 128 | 102.4 | 91.4 | 91.4 |
| G = 1/8 | Symbol time, Ts (μs) | | 102.857 | 144 | 115.2 | 102.857 | 102.857 |
| | FDD | Number of OFDMA symbols per 5 ms frame | 48 | 34 | 43 | 48 | 48 |
| | | Idle time (μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG (μs) | 165.714 | 248 | 161.6 | 165.714 | 165.714 |
| G = 1/16 | Symbol time, Ts (μs) | | 97.143 | 136 | 108.8 | 97.143 | 97.143 |
| | FDD | Number of OFDMA symbols per 5 ms frame | 51 | 36 | 45 | 51 | 51 |
| | | Idle time (μs) | 45.71 | 104 | 104 | 45.71 | 45.71 |
| | TDD | Number of OFDMA symbols per 5 ms frame | 50 | 35 | 44 | 50 | 50 |
| | | TTG + RTG (μs) | 142.853 | 240 | 212.8 | 142.853 | 142.853 |
| G = 1/4 | Symbol time, Ts (μs) | | 114.286 | 160 | 128 | 114.286 | 114.286 |
| | FDD | Number of OFDMA symbols per 5 ms frame | 43 | 31 | 39 | 43 | 43 |

TABLE 1-continued

|  |  |  |  |  |  |  |
|---|---|---|---|---|---|---|
|  | Idle time (μs) | 85.694 | 40 | 8 | 85.694 | 85.694 |
| TDD | Number of OFDMA symbols per 5 ms frame | 42 | 30 | 38 | 42 | 42 |
|  | TTG + RTG (μs) | 199.98 | 200 | 136 | 199.98 | 199.98 |
| Number of Guard subcarriers | Left | 40 | 80 | 80 | 80 | 160 |
|  | Right | 39 | 79 | 79 | 79 | 159 |
| Number of used subcarriers |  | 433 | 865 | 865 | 865 | 1729 |
| Number of PRU in type-1 subframe |  | 24 | 48 | 48 | 48 | 96 |

In Table 1, $N_{FFT}$ denotes a smallest power of 2 greater than $N_{used}$. A sampling factor is defined as $F_s=\text{floor}(n \cdot BW/8000) \times 8000$. A subcarrier spacing is defined as $\Delta f = F_s/N_{FFT}$. A useful symbol time is defined as $Tb=1/\Delta f$. A CP time is defined as $Tg=G \cdot Tb$. An OFDMA symbol time is defined as $Ts=Tb+Tg$. A sampling time is defined as $Tb/N_{FFT}$.

A subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. The number of OFDM symbols included in the PRU may be equal to the number of OFDM symbols included in one subframe. Therefore, the number of OFDM symbols in the PRU can be determined according to a subframe type. For example, when one subframe consists of 6 OFDM symbols, the PRU may be defined with 18 subcarriers and 6 OFDM symbols.

A logical resource unit (LRU) is a basic logical unit for distributed resource allocation and contiguous resource allocation. The LRU is defined with a plurality of OFDM symbols and a plurality of subcarriers, and includes pilots used in the PRU. Therefore, a desired number of subcarriers for one LRU depends on the number of allocated pilots.

A distributed logical resource unit (DLRU) may be used to obtain a frequency diversity gain. The DLRU includes a distributed subcarrier group in one frequency partition. The DRU has the same size as the PRU. One subcarrier is a basic unit of constituting the DRU.

A contiguous logical resource unit (CLRU) may be used to obtain a frequency selective scheduling gain. The CLRU includes a localized subcarrier group. The CLRU has the same size as the PRU.

Figure 3:
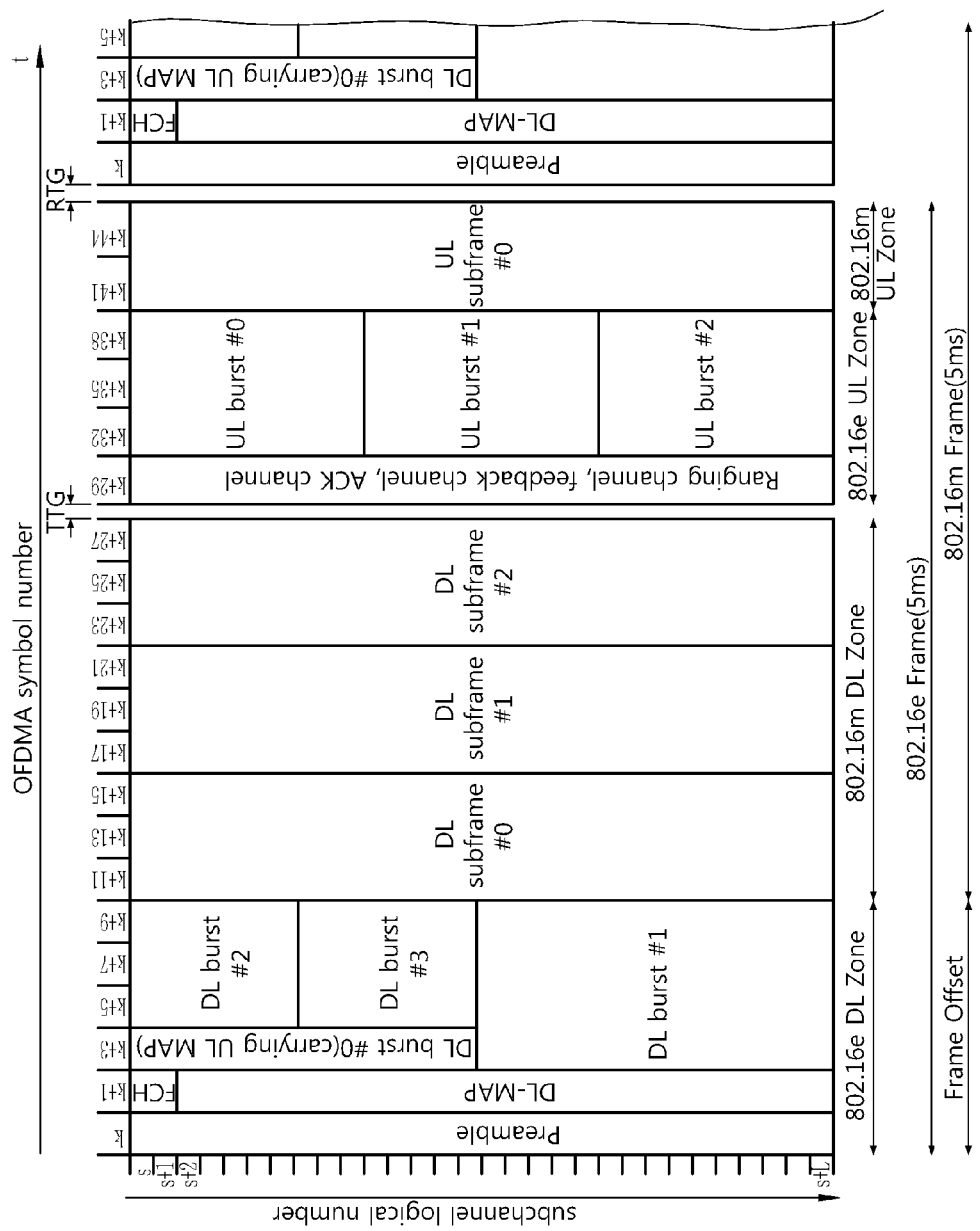
FIG. 3 shows another example of a frame structure.

FIG. 3 shows another example of a frame structure. The frame structure of FIG. 3 is a TDD frame structure in the legacy support mode in which not only an MS supporting an IEEE 802.16m system (hereinafter referred to as a '16m AMS'), but also an MS supporting an IEEE 802.16e system (hereinafter referred to as a '16e MS') is supported.

Referring to FIG. 3, the frame includes a DL subframe and an UL subframe. The DL subframe is anterior to the UL subframe in term of the time. The DL subframe is started in order of a preamble, a frame control header (FCH), a DL-MAP, an UL-MAP, and a burst region. The UL subframe includes an uplink control channel such as a feedback channel or a ranging channel, a burst region, and so on. A guard time for distinguishing the DL subframe and the UL subframe from each other is inserted into the middle part (between the DL subframe and the UL subframe) and the last part (subsequent to the UL subframe) of the frame. A transmit/receive transition gap (TTG) is a gap between a DL burst and a subsequent UL burst. A receive/transmit transition gap (RTG) is a gap between an UL burst and a subsequent DL burst. A DL region and an UL region are divided into a region for a 16e MS and a region for a 16m AMS. In the DL region, the preamble, the FCH, DL-MAP, the UL-MAP, and the DL burst region are regions for the 16e MS, and the remaining DL regions are regions for the 16m AMS. In the UL region, the uplink control channel and the UL burst region are regions for the 16e MS, and the remaining UL regions are regions for the 16m AMS. In the UL region, the regions for the 16e MS and the regions for the 16m AMS can be multiplexed in various ways. In FIG. 3, the UL region is illustrated to be multiplexed according to the TDM scheme, but the present invention is not limited thereto. For example, the UL region can be multiplexed according to the FDM scheme.

The preamble is used for initial synchronization between a BS and an MS, cell search, frequency offset, and channel estimation. The FCH includes information about the length of a DL-MAP message and the coding scheme of a DL-MAP. The DL-MAP is a region in which the DL-MAP message is transmitted. The DL-MAP message is used to define access to a DL channel. This means that the DL-MAP message defines instruction information or control information or both about the DL channel. The DL-MAP message includes the configuration change count of a downlink channel descriptor (DCD) and a BS identifier (ID). The DCD describes a DL burst profile currently applied to a map. The DL burst profile refers to the characteristic of a DL physical channel, and the DCD is periodically transmitted by a BS through a DCD message. The UL-MAP is a region in which an UL-MAP message is transmitted. The UL-MAP message defines access to an UL channel. This means that the UL-MAP message defines instruction information or control information or both about the UL channel. The UL-MAP message includes the configuration change count of an uplink channel descriptor (UCD) and an UL allocation start time defined by the UL-MAP. The UCD describes an UL burst profile. The UL burst profile refers to the characteristic of an UL physical channel. The UCD is periodically transmitted by a BS through an UCD message. The DL burst is a region in which data are transmitted from a BS to an MS, and the UL burst is a region in which data are transmitted from an MS to a BS. The fast feedback region is included in the UL burst region of an OFDM frame. The fast feedback region is used to transmit information requiring fast response to a BS. The fast feedback region can be used for CQI transmission. The position of the fast feedback region is determined by the UL-MAP. The position of the fast feedback region can be a fixed position or a variable position within the OFDM frame.

Figure 4:
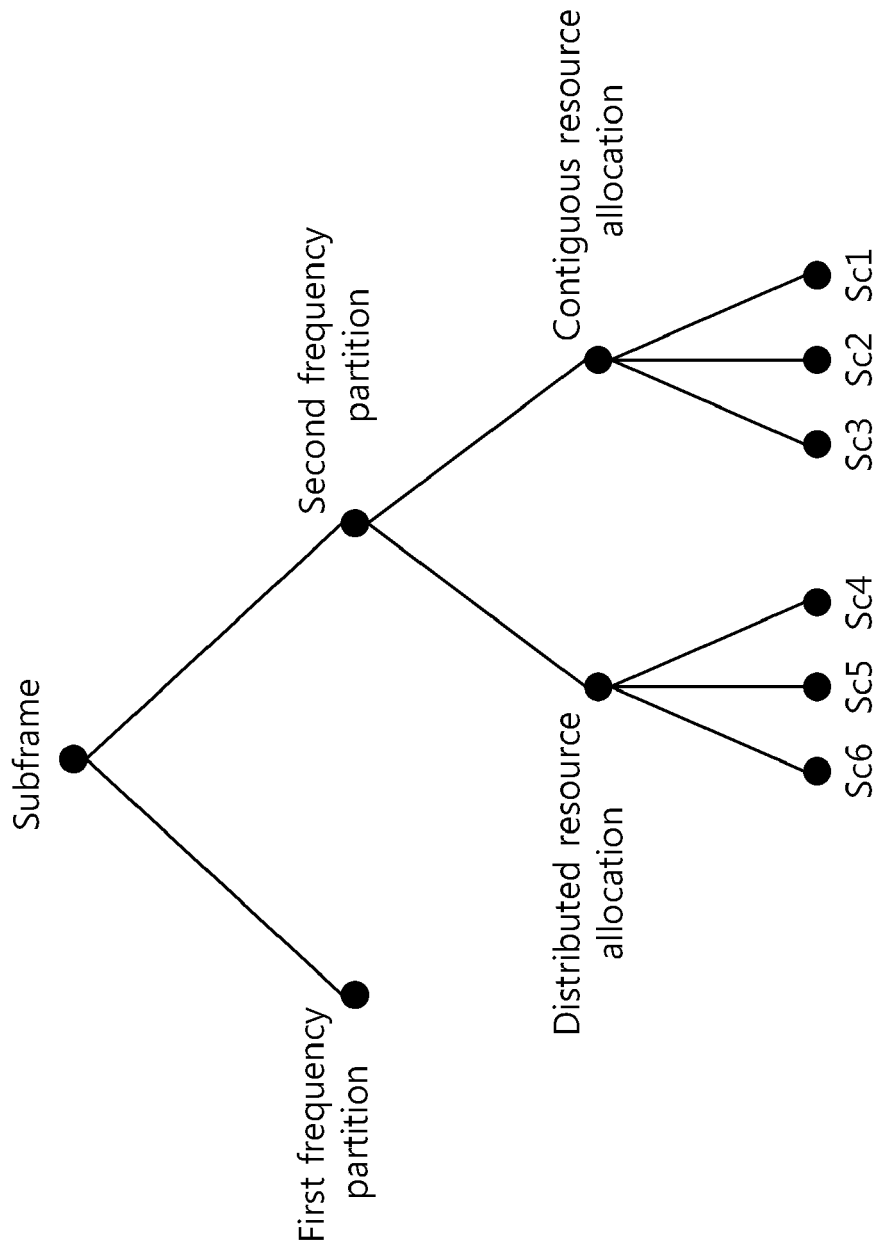
FIG. 4 shows an example of an uplink resource structure.

FIG. 4 shows an example of an uplink resource structure.

Referring to FIG. 4, an uplink subframe can be divided into at least one FP. Herein, the subframe is divided into two FPs (i.e., FP1 and FP2) for example. However, the number of FPs in the subframe is not limited thereto. The number of FPs can be 4 at most. Each FP can be used for other purposes such as FFR.

Each FP consists of at least one PRU. Each FP may include distributed resource allocation and/or contiguous resource allocation. Herein, the second FP (i.e., FP2) includes the distributed resource allocation and the contiguous resource allocation. 'Sc' denotes a subcarrier.

A legacy support mode in which a 16e MS is supported in an IEEE 802.16m system can be provided. In the legacy support mode, a 16m AMS and a 16e MS are multiplexed.

In the legacy support mode, a new symbol structure can be proposed. A plurality of subcarriers can be classified into an $N_{g,left}$ number of left guard subcarriers, an $N_{g,right}$ number of right guard subcarriers, and an $N_{used}$ number of used subcarriers. The used subcarriers can be classified into a plurality of partial usage of subchannel (PUSC) tiles.

Figure 5:
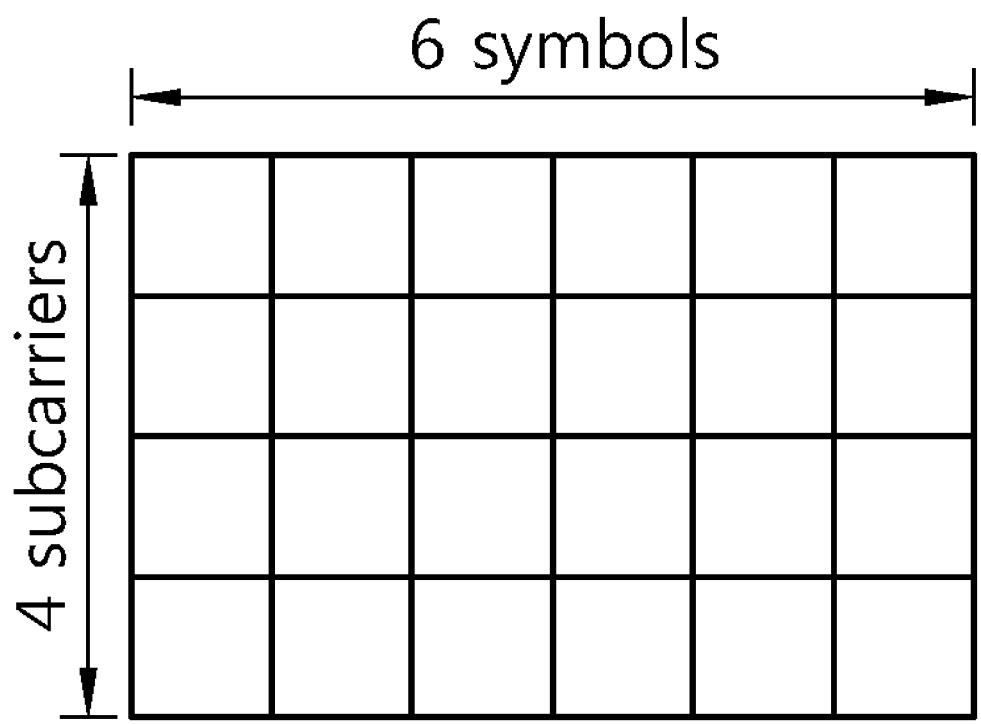
FIG. 5 shows an example of a PUSC tile structure.

FIG. 5 shows an example of a PUSC tile structure. The PUSC tile can include four contiguous subcarriers and six OFDM symbols.

Figure 6:
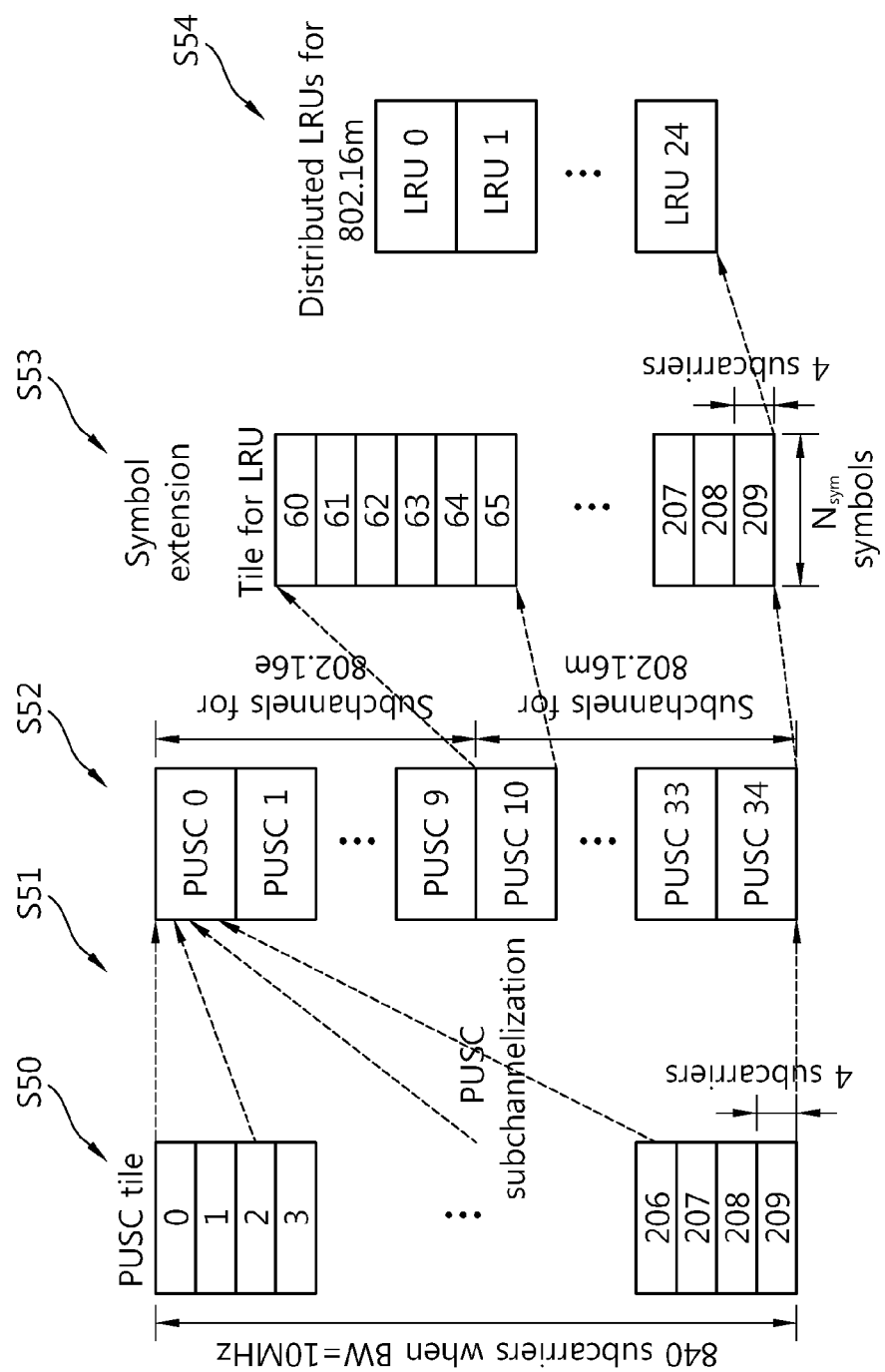
FIG. 6 shows an example of a subchannelization process of mapping subcarriers to subchannels in the legacy support mode.

FIG. 6 shows an example of a subchannelization process of mapping subcarriers to subchannels in the legacy support mode. In the legacy support mode, UL resources can be subchannelized through the following process.

1) Step S50: all available subcarriers are classified into a plurality of PUSC tiles. For example, when the bandwidth is 10 MHz and the number of subcarriers is 840, the subcarriers can be classified into a total of 210 PUSC tiles.

2) Step S51: PUSC subchannelization is performed on the plurality of PUSC tiles.

3) Step S52: PUSC tiles for a 16e MS, from among the plurality of PUSC tiles on which the PUSC subchannelization has been performed, are first specified, and the remaining available PUSC tiles are then specified as PUSC tiles for a 16m AMS.

4) Step S53: the PUSC tiles for a 16m AMS, specified at step S52, are extended into an Nsym OFDM symbols from three OFDM symbols in the time domain. The above Nsym can vary according to the type of the subframe.

5) Step S54: a DRU is generated on the basis of the PUSC tiles extended at step S53.

6) Step S55: the steps S53 and S54 are repeated performed on the remaining OFDM symbols of all the UL subframes.

Meanwhile, subchannel rotation can be applied on a subchannel basis. A physical resource allocated to a subchannel for every consecutive slots is changed according to the subchannel rotation. The subchannel rotation can be applied during each OFDM slot interval.

Hereinafter, a ranging channel structure is described.

In an IEEE 802.16e system, a ranging channel structure can be changed according to the use of the ranging channel. The ranging channel can be used for initial access or handover or for periodic ranging or a bandwidth request. An MS can transmit an initial access ranging channel for the purpose of the time synchronization of initial UL and can transmit a handover ranging channel for the purpose of handover to another cell. Alternatively, an MS can transmit a periodic ranging channel in order to update time and frequency synchronization and can transmit a bandwidth request ranging channel in order to request frequency resources. Information about the type of a ranging channel and the allocation of time or frequency resources allocated to the ranging channel can be broadcasted through the UL-MAP.

Figure 7:
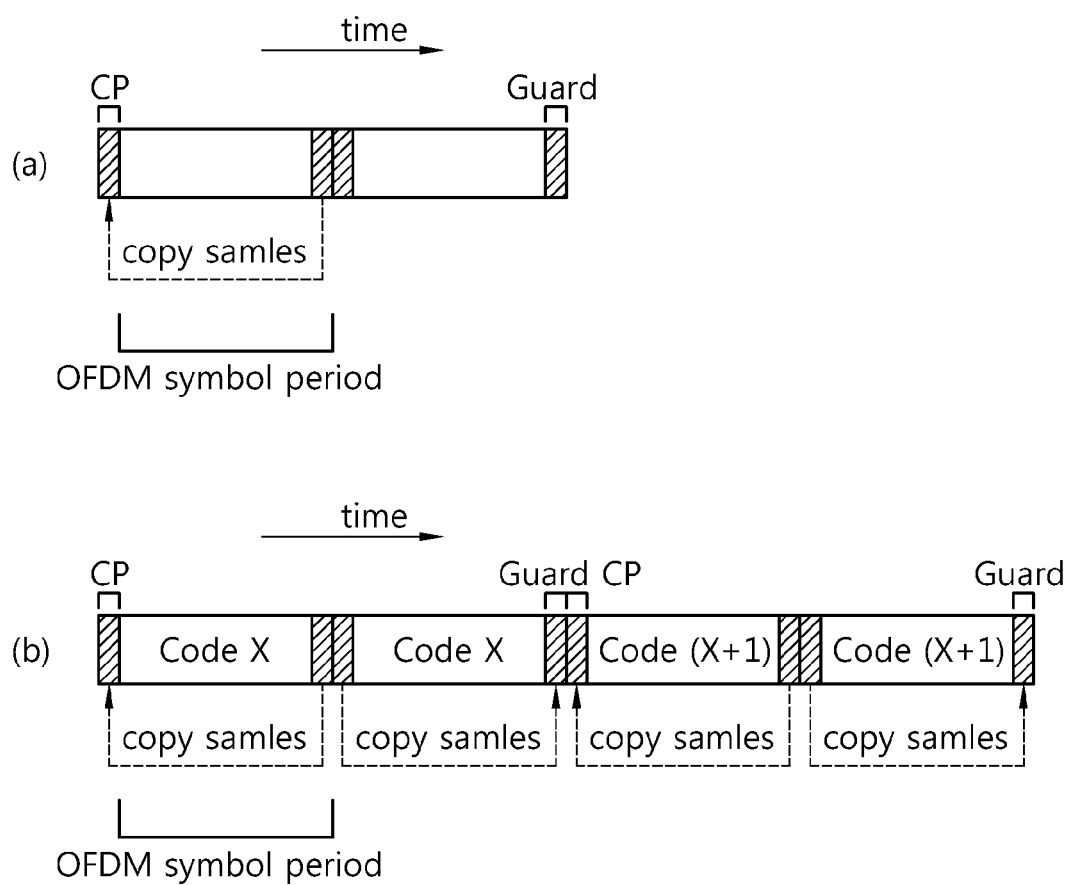
FIG. 7 shows an example of the structure of an initial access ranging channel or a handover ranging channel of an IEEE 802.16e system.

FIG. 7 shows an example of the structure of an initial access ranging channel or a handover ranging channel of an IEEE 802.16e system.

A ranging channel of FIG. 7(a) includes two contiguous OFDM symbols. The ranging channel structure shown in FIG. 7(a) is hereinafter referred to as an RCH-a. During each OFDM symbol period, the same ranging code can be transmitted between two symbols without phase discontinuity in a ranging channel. A ranging channel of FIG. 7(b) includes four contiguous OFDM symbols. A ranging channel structure shown in FIG. 7(b) is hereinafter referred to as an RCH-a'. A BS can allocate 2 contiguous ranging codes, and thus an MS transmits 2 contiguous ranging codes. In other words, ranging codes used in a third OFDM symbol and a fourth OFDM symbol can be contiguous to ranging codes used in a first OFDM symbol and a second OFDM symbol. A BS can select one of the ranging channel structures shown in FIGS. 7(a) and 7(b) and broadcast a selected ranging channel structure to an MS. For example, a BS can use the ranging channel structure of FIG. 7(a) in a cell having a good channel state and can use the ranging channel structure of FIG. 7(b) in order to enhance the reception energy in a cell having a poor channel state.

Figure 8:
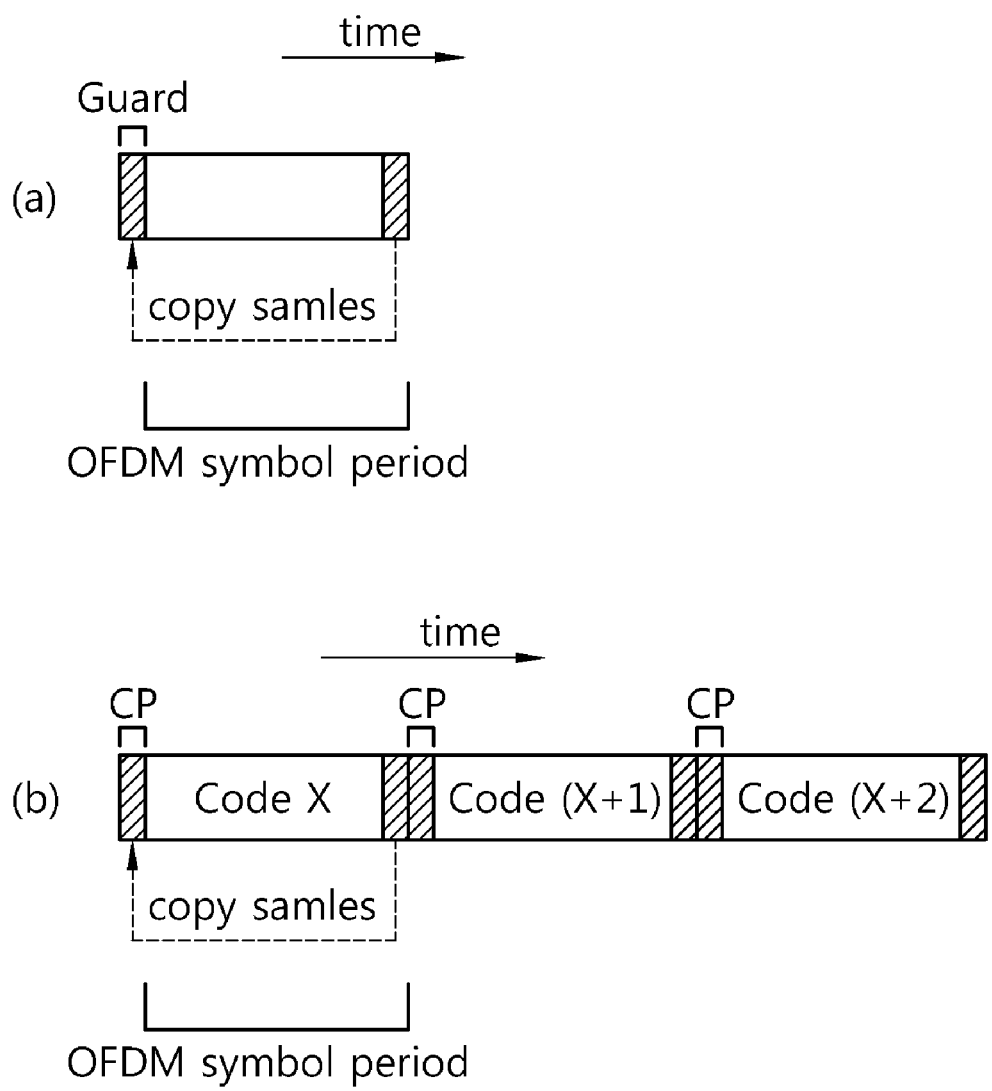
FIG. 8 shows an example of the structure of a periodic ranging channel or a bandwidth request ranging channel of an IEEE 802.16e system.

FIG. 8 shows an example of the structure of a periodic ranging channel or a bandwidth request ranging channel of an IEEE 802.16e system.

A ranging channel of FIG. 8(a) includes one OFDM symbol. The ranging channel structure shown in FIG. 8(a) is hereinafter referred to as an RCH-b. During one OFDM symbol period, one ranging code can be modulated on a ranging subchannel. The ranging subchannel can be dynamically allocated by media access control (MAC) and can be indicated by the UL-MAP. A ranging channel of FIG. 8(b) includes three OFDM symbols. During the three OFDM symbol periods, 3 contiguous ranging codes can be modulated on a ranging subchannel. The ranging subchannel can be dynamically allocated by MAC and can be indicated by the UL-MAP.

Figure 9:
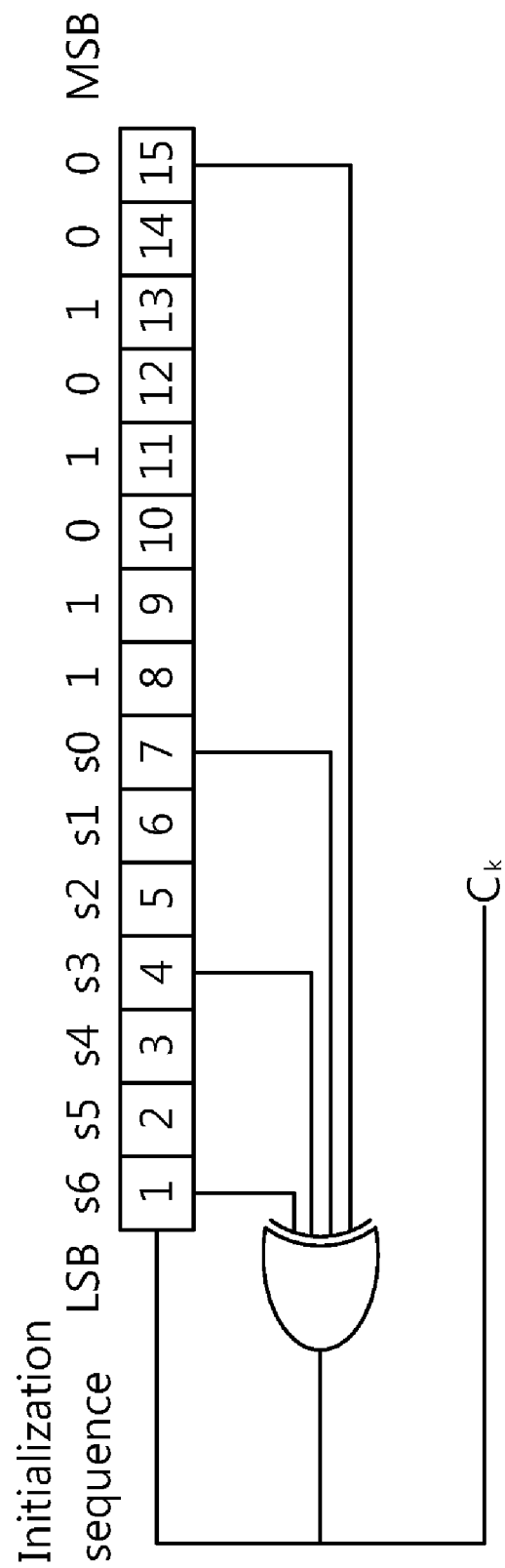
FIG. 9 is a block diagram of a pseudo random binary sequence (PRBS) generator for generating the ranging codes used in FIG. 7 or 8.

FIG. 9 is a block diagram of a pseudo random binary sequence (PRBS) generator for generating the ranging codes used in FIG. 7 or 8. The PRBS generator of FIG. 9 generates the ranging codes using $1+x^1+x^4+x^7+x^{15}$ (i.e., a PN code generation equation).

Various values can be used as the initial value of a PRBS. For example, $\{b14,b13,\ldots,b1,b0\}=\{0,0,1,0,0,1,0,1,1,s0,s1,s2,s3,s4,s5,s6\}$ can be used as the initial value of the PRBS. Here, $\{b6,\ldots,b0\}$ denotes UL_PermBase, and s6 can denote the least significant bit (LSB) of the initial value and the most significant bit (MSB) of UL_PermBase, of the PRBS.

A binary ranging code is the subsequence of a pseudonoise sequence indicative of the output $C_k$ of FIG. 9. The length of each ranging code can be 144 bits. The ranging code is used to modulate subcarriers within a DLRU group including 6 adjacent DLRUs. Each of bits of the ranging code is mapped to a subcarrier so that a bit having the smallest index can modulate a subcarrier having the smallest frequency index and a bit having the greatest index can modulate a subcarrier having the greatest frequency index. Within each DLRU group, the index of a DLRU having the smallest index can be a multiple of 6.

The number of ranging codes generated by the PRBS generator of FIG. 9 can be 256. Each BS can use some of the 256 ranging codes. The generated ranging codes are classified according to their purposes. For example, first N number of codes can be used for initial access ranging, subsequent L number of codes can be used for handover ranging, and subsequent M number of codes can be used for a periodic ranging channel.

In an IEEE 802.16m system, ranging channels can be classified into a ranging channel for a non-synchronized AMS and a ranging channel for a synchronized MS. The ranging channel for a non-synchronized AMS can be used for ranging for a target BS during the initial network entry and handover of an MS. The ranging channel for a synchronized MS can be used for periodic ranging. An MS already synchronized with a target BS can transmit a ranging signal for a synchronized MS.

Even in the legacy support mode, the ranging channel is transmitted. The ranging channel structure of an IEEE 802.16m system has been described as a ranging channel structure in the legacy support mode. However, the ranging channel structure of the IEEE 802.16m system is difficult to be used in the legacy support mode because the ranging channel is allocated to a localized bandwidth. In particular, in the case in which a 16m AMS and a 16e MS using PUSC tiles are multiplexed according to the frequency division multiplexing (FDM) scheme, whether the ranging channel resources of the IEEE 802.16m system can be allocated in the frequency domain cannot be guaranteed. Further, although the ranging channel structure of the IEEE 802.16m system is used without a change, resources cannot be efficiently used because of a limit to the coverage and performance of an IEEE 802.16e system. Accordingly, there is a need for a method of allocating a ranging channel which is able to use distributed frequency resources in the legacy support mode.

A method of allocating a ranging channel, proposed according to an embodiment, is described below. In the present invention, a method of using the ranging channel structure of an IEEE 802.16e system as the ranging channel structure of the legacy support mode is proposed. This is because a 16e MS cannot support the coverage and performance of an IEEE 802.16m system and thus the ranging channel structure of the IEEE 802.16m system needs not to be used. Overhead can be minimized by reusing the ranging channel structure of the IEEE 802.16e system.

Figure 10:
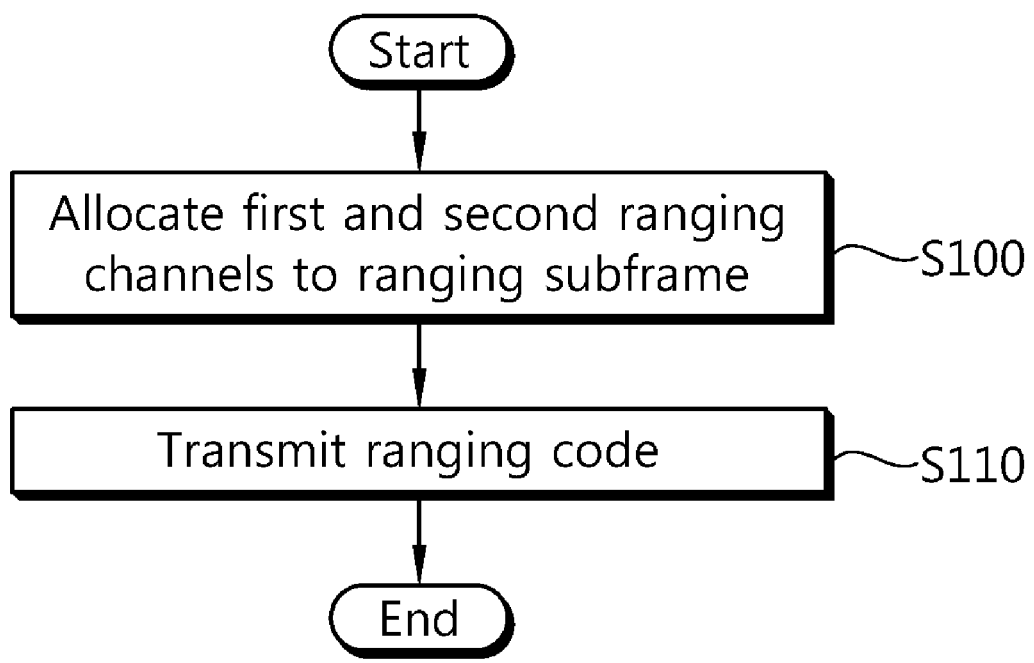
FIG. 10 shows a proposed method of allocating a ranging channel according to an embodiment.

FIG. 10 shows a proposed method of allocating a ranging channel according to an embodiment.

At step S100, a BS allocates at least one first ranging channel having a first structure and at least one second ranging channel having a second structure to a ranging subframe. The first structure or the second structure can be any one of the ranging channel structures of an IEEE 802.16e system. Further, the number of OFDM symbols included in the first structure can differ from the number of OFDM symbols included in the second structure. At step S110, an MS transmits a ranging code to the BS through any one of the at least one first ranging channel and the at least one second ranging channel.

At least one ranging channel can be allocated to the ranging subframe in various forms. Meanwhile, in the legacy support mode, a 16e MS and a 16m AMS can be multiplexed. Hereinafter, a resource region used by a 16e MS is referred to as an L-zone, and a resource region used by a 16m AMS is referred to as an M-zone. The at least one ranging channel can be allocated to the L-zone or the M-zone.

First, the ranging channel including the two contiguous OFDM symbols in FIG. 7(a) can be allocated as a ranging channel in the legacy support mode in the L-zone.

Figure 11:
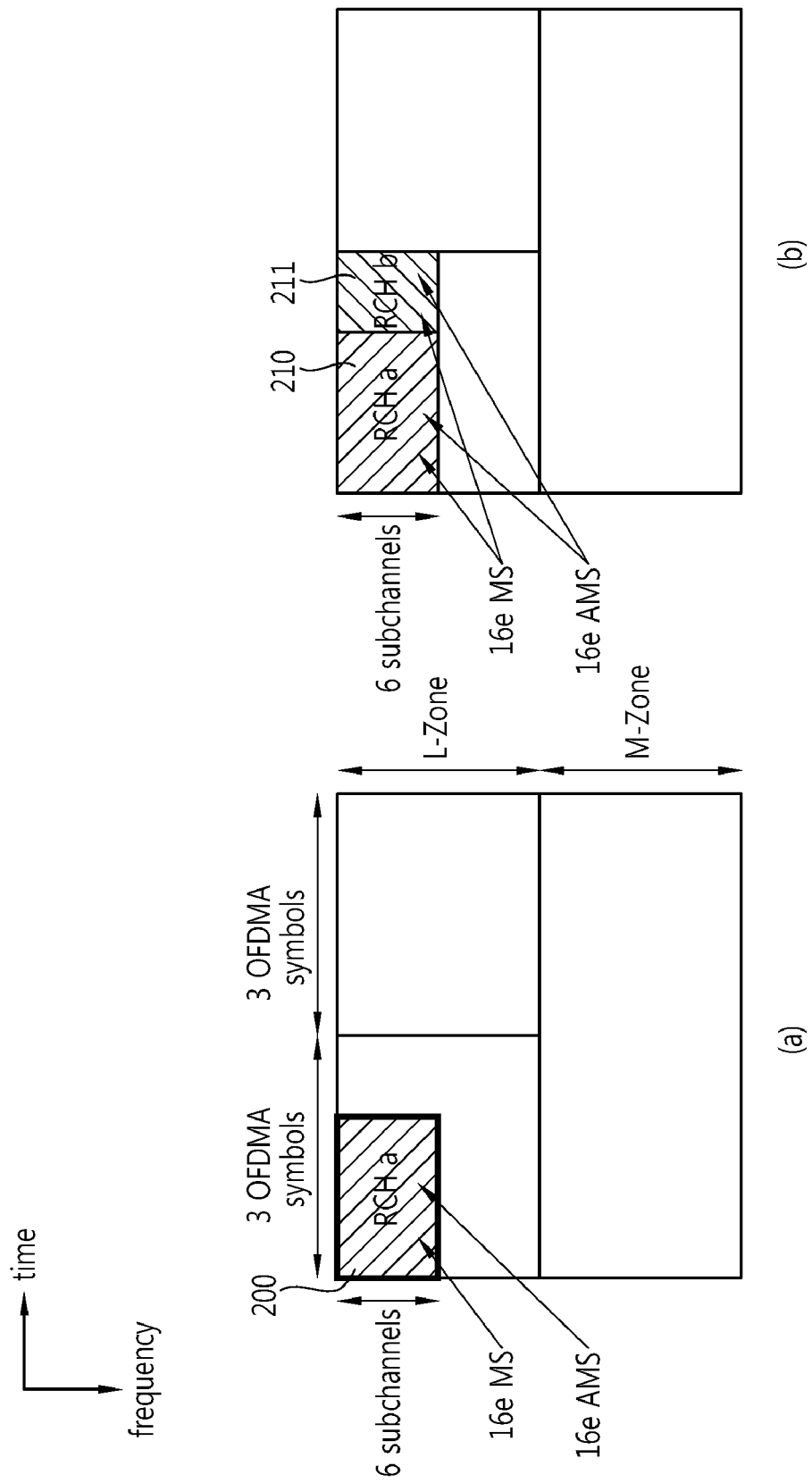
FIGS. 11 to 19 is an example of a ranging channel structure in the legacy support mode according to the proposed method of allocating a ranging channel.

FIG. 11 is an example of a ranging channel structure in the legacy support mode according to the proposed method of allocating a ranging channel.

In FIG. 11(a), the ranging channel structure (i.e., RCH-a) 200 of FIG. 7(a) is allocated to the L-zone. The RCH-a 200 includes 6 subchannels in the frequency domain. Both a 16e MS and a 16m AMS perform ranging through the RCH-a 200. In this case, since additional ranging channels for the 16e MS and the 16m AMS need not to be configured, overhead can be reduced.

In FIG. 11(b), the ranging channel structure (i.e., RCH-a) 210 of FIG. 7(a) and the ranging channel structure (i.e., RCH-b) 211 of FIG. 8(a) are contiguously allocated to the L-zone. Each of the RCH-a 210 and the RCH-b 211 include 6 subchannels in the frequency domain. The RCH-a 210 and the RCH-b 211 can be ranging channels for different purposes. For example, the RCH-a 210 can be used as an initial access ranging channel, and the RCH-b 211 can be used as a periodic ranging channel. It is hereinafter assumed that the RCH-a is used as an initial access ranging channel or a handover ranging channel and the RCH-b is used as a periodic ranging channel. Each of a 16e MS and a 16m AMS performs ranging through the RCH-a 210 or the RCH-b 211. Here, it can be seen that the 16m AMS receives only position information about time resources and frequency resources where a ranging channel is started and the ranging channel consists of a ranging channel structure including two OFDM symbols and a ranging channel structure including one OFDM symbol.

Alternatively, the ranging channel including the two contiguous OFDM symbols in FIG. 7(a) can be allocated as a ranging channel in the legacy support mode in the M-zone. Ranging can be performed relatively simply in such a manner that a 16e MS performs ranging in the L-zone and a 16m AMS performs ranging in the M-zone.

The basic unit of the resource allocation of an IEEE 802.16e system is a subchannel including three OFDM symbols in the time domain. The basic unit of the resource allocation of an IEEE 802.16m system is a PRU including six OFDM symbols in the time domain. Accordingly, in the legacy support mode, in the case in which the ranging channel structure of an IEEE 802.16e system is used in the M-zone, a plurality of ranging channels can be allocated. The plurality of ranging channels can be multiplexed within a ranging subframe in which ranging is transmitted. Resources can be efficiently used and overhead can be reduced by previously determining the multipexing scheme of a plurality of ranging channels. The plurality of ranging channels can be multiplexed in various ways. The multipexing scheme can be signaled by a BS. For example, in an IEEE 802.16m system, a field transmitted through an SFH and configured to indicate a ranging channel format can be used as a field indicating the multipexing scheme of a plurality of ranging channels in the legacy support mode. It can be seen that a 16m AMS receives only position information about time resources and frequency resources where a ranging channel is started, and a plurality of ranging channels exist in the M-zone.

Figure 12:
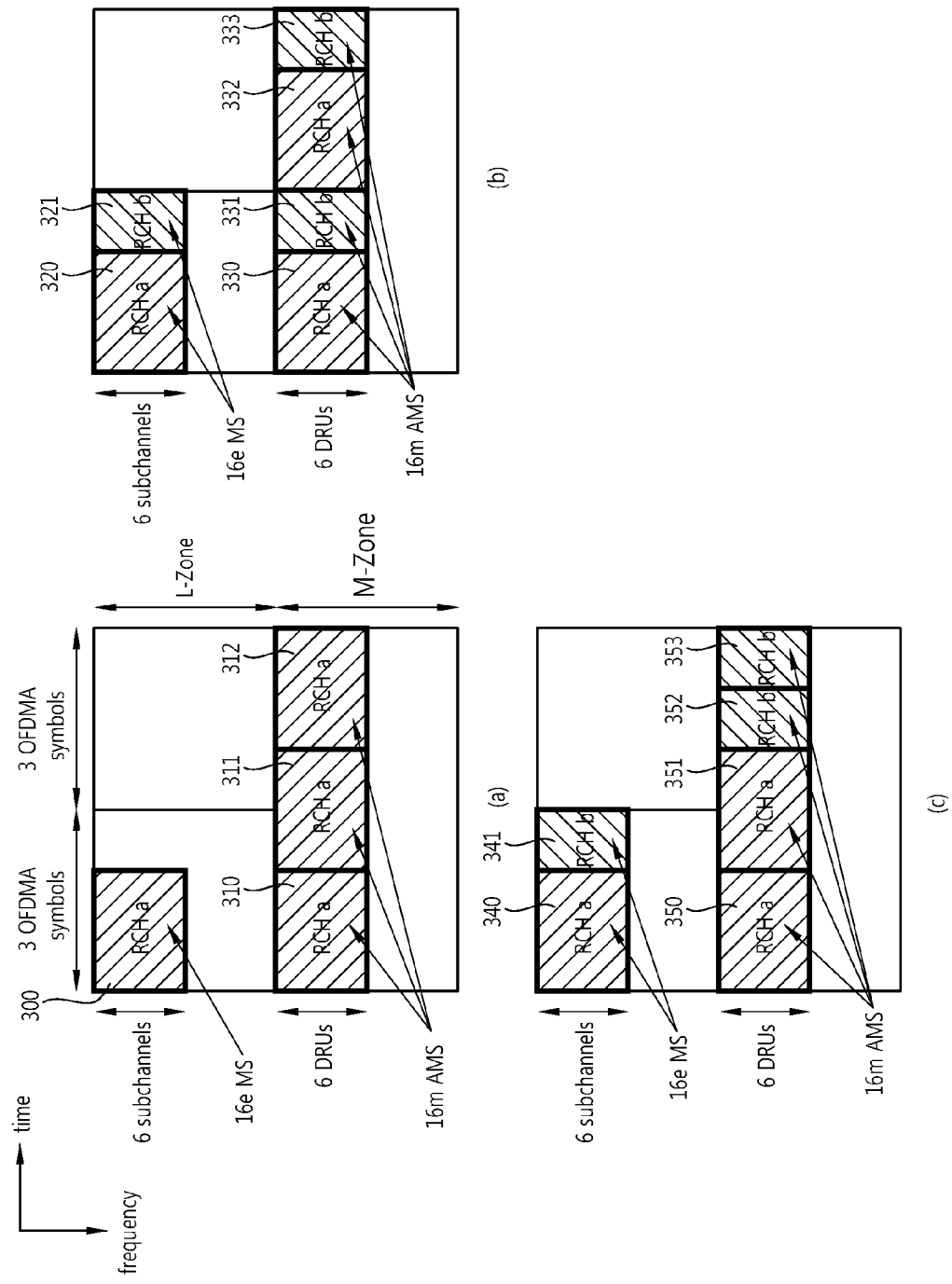

FIG. 12 is another example of a ranging channel structure of the legacy support mode according to the proposed method of allocating a ranging channel.

In FIG. 12(a), the ranging channel structure (i.e., RCH-a) of FIG. 7(a) is allocated to an L-zone and an M-zone. A first RCH-a 300 is allocated to the L-zone. 3 RCH-as 310, 311, and 312, including a second RCH-a to a fourth RCH-a, are multiplexed and allocated to the M-zone. The first RCH-a 300 includes 6 subchannels in the frequency domain, and the second RCH-a to fourth RCH-a 310, 311, and 312 include 6 DRUs (Distributed Resource Units) in the frequency domain. A 16e MS performs ranging through the first RCH-a 300, and a 16m AMS performs ranging through the second RCH-a to the fourth RCH-a 310, 311, and 312.

In FIG. 12(b), the ranging channel structure (i.e., RCH-a) of FIG. 7(a) and the ranging channel structure (i.e., RCH-b) of FIG. 8(a) are allocated to an L-zone and an M-zone. A first RCH-a 320 and a first RCH-b 321 are contiguously allocated to the L-zone. A second RCH-a 330, a second RCH-b 331, a third RCH-a 332, and a third RCH-b 333 are allocated to the M-zone contiguously and sequentially. The first RCH-a 320 and the first RCH-b 321 include 6 subchannels in the frequency domain. The second RCH-a 330, the second RCH-b 331, the third RCH-a 332, and the third RCH-b 333 include 6 DRUs in the frequency domain. A 16e MS performs ranging through the first RCH-a 320 and the first RCH-b 321. A 16m AMS performs ranging through the second RCH-a 330, the second RCH-b 331, the third RCH-a 332, and the third RCH-b 333.

In FIG. 12(c), the ranging channel structure (i.e., RCH-a) of FIG. 7(a) and the ranging channel structure (i.e., RCH-b) of FIG. 8(a) are allocated to an L-zone and an M-zone. A first RCH-a 340 and a first RCH-b 341 are contiguously allocated to the L-zone. A second RCH-a 350, a third RCH-a 351, a second RCH-b 352, and a third RCH-b 353 are allocated to the M-zone contiguously and sequentially. The first RCH-a 340 and the first RCH-b 341 include 6 subchannels in the frequency domain. The second RCH-a 350, the third RCH-a 351, the second RCH-b 352, and the third RCH-b 353 include 6 DRUs in the frequency domain. A 16e MS performs ranging through the first RCH-a 340 and the first RCH-b 341. A 16m AMS performs ranging through the second RCH-a 350, the third RCH-a 351, the second RCH-b 352, and the third RCH-b 353.

Figure 13:
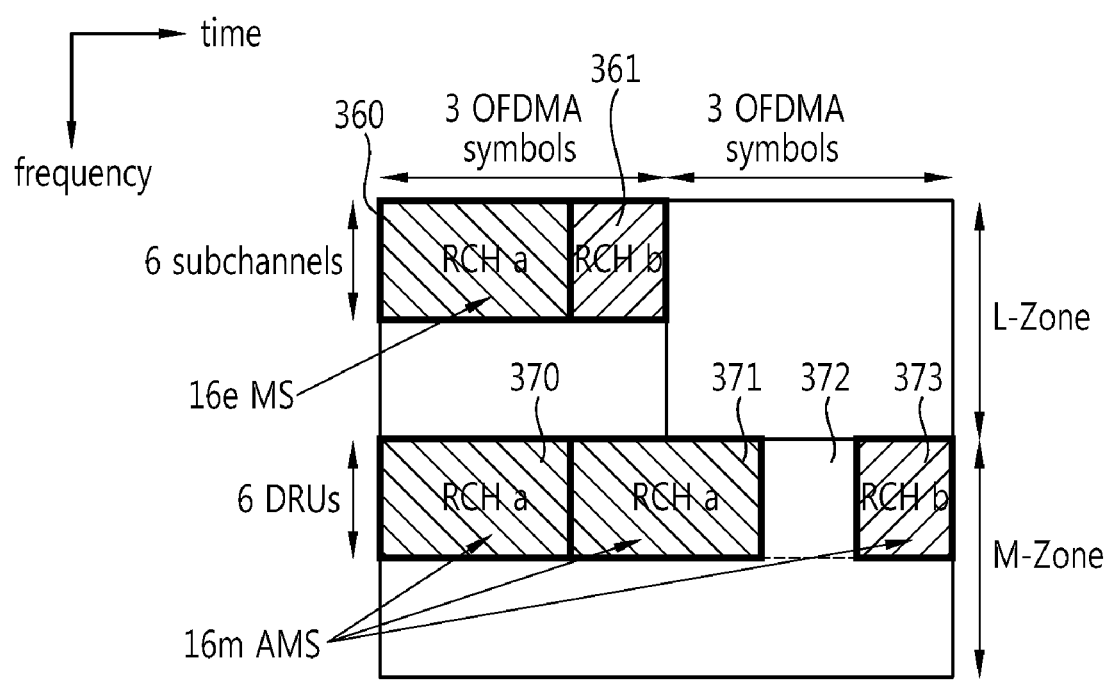

FIG. 13 is another example of a ranging channel of the legacy support mode according to the proposed method of allocating a ranging channel.

In FIG. 13, the ranging channel structure (i.e., RCH-a) of FIG. 7(a) and the ranging channel structure (i.e., RCH-b) of FIG. 8(a) are allocated to an L-zone and an M-zone. A first RCH-a 360 and a first RCH-b 361 are contiguously allocated to the L-zone. A second RCH-a 370 and a third RCH-a 371 are contiguously allocated to the M-zone, and one OFDM symbol 372 is then empty, and a second RCH-b 373 is allocated to the M-zone. That is, a guard time 372 can be allocated between the third RCH-a 371 and the second RCH-b 373. Accordingly, within one ranging subframe, the first four OFDM symbols can be used for initial access ranging or handover ranging, and the last OFDM symbols can be used for periodic ranging or a bandwidth request. In this case, in the case in which different kinds of ranging channels are multiplexed in a resource region and MSs out of UL synchronization perform ranging, Inter-Symbol Interference (ISI) occurring when a BS receives a plurality of ranging channels can be prevented. The first RCH-a 360 and the first RCH-b 361 include 6 subchannels in the frequency domain, and the second RCH-a 370, the third RCH-a 371, and the second RCH-b 373 include 6 DRUs in the frequency domain. A 16e MS performs ranging through the first RCH-a 360 and the first RCH-b 361, and a 16m AMS performs ranging through the second RCH-a 370, the third RCH-a 371, and the second RCH-b 373.

Figure 14:
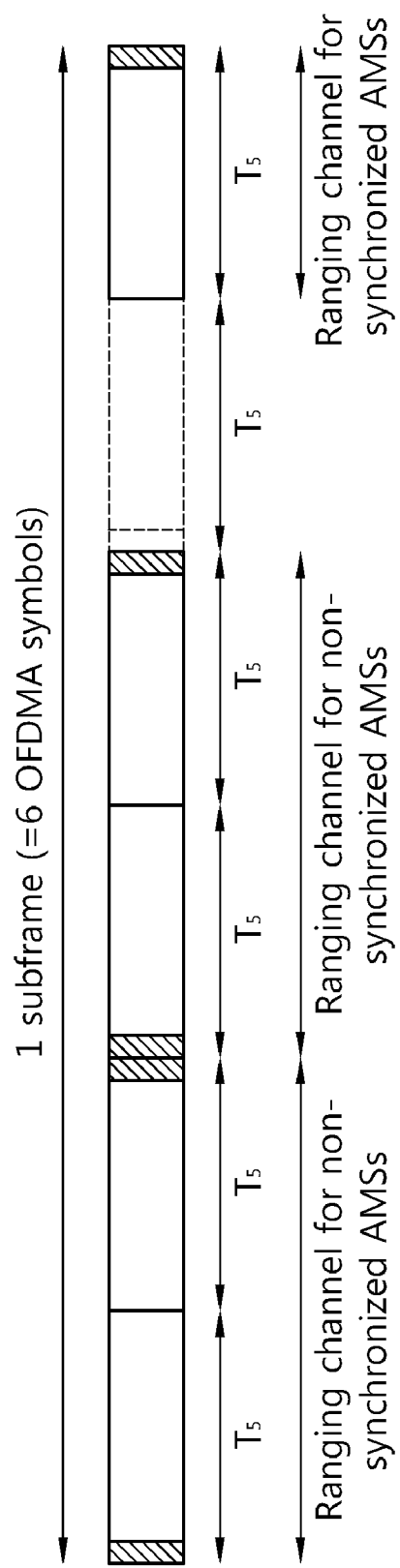

FIG. 14 is another example of a ranging channel structure of the legacy support mode according to the proposed method of allocating a ranging channel. FIG. 14 shows the structure of the ranging channel, shown in FIG. 13, in the time domain. In a ranging subframe, the ranging channel structure of FIG. 7(a) is consecutively allocated to the first four OFDM symbols, and the ranging channel structure of FIG. 8(a) is allocated to the last OFDM symbol. A fifth OFDM symbol is used as a guard time. The first four OFDM symbols of the ranging subframe can be used as ranging channels for non-synchronized AMSs, and an initial access ranging channel or a handover ranging channel can be transmitted through the first four OFDM symbols of the ranging subframe. The last OFDM symbol of the ranging subframe can be used as a ranging channel for a synchronized AMS, and a periodic ranging channel can be transmitted through the last OFDM symbol of the ranging subframe.

Alternatively, the ranging channel including four contiguous OFDM symbols of FIG. 7(b) can be used in an M-zone and allocated to a ranging channel in the legacy support mode. An IEEE 802.16m system allocates resources for every six OFDM symbols. Accordingly, if the ranging channel structure of FIG. 7(a) is used as the ranging channel structure of the legacy support mode, overhead is increased. In this case, overhead can be reduced by using the ranging channel structure of FIG. 7(b) in the time domain and also reducing the amount of resources allocated to the frequency domain. That is, the ranging channel can be allocated in the state in which the amount of resources allocated to the time domain is increased and the amount of resources allocated to the frequency domain is reduced, as compared with the ranging channel structures of FIGS. 11 to 14. A ranging channel for periodic ranging or a bandwidth request can be repeatedly allocated in the time domain in order to compensate for the amount of reduced frequency resources. For example, the ranging channel structure of FIG. 8(a) can be repeatedly allocated in the time domain over two OFDM symbols. Alternatively, as a new ranging channel structure, the ranging channel structure of FIG. 7(a) can be used as a ranging channel structure for periodic ranging or a bandwidth request in the M-zone.

Figure 15:
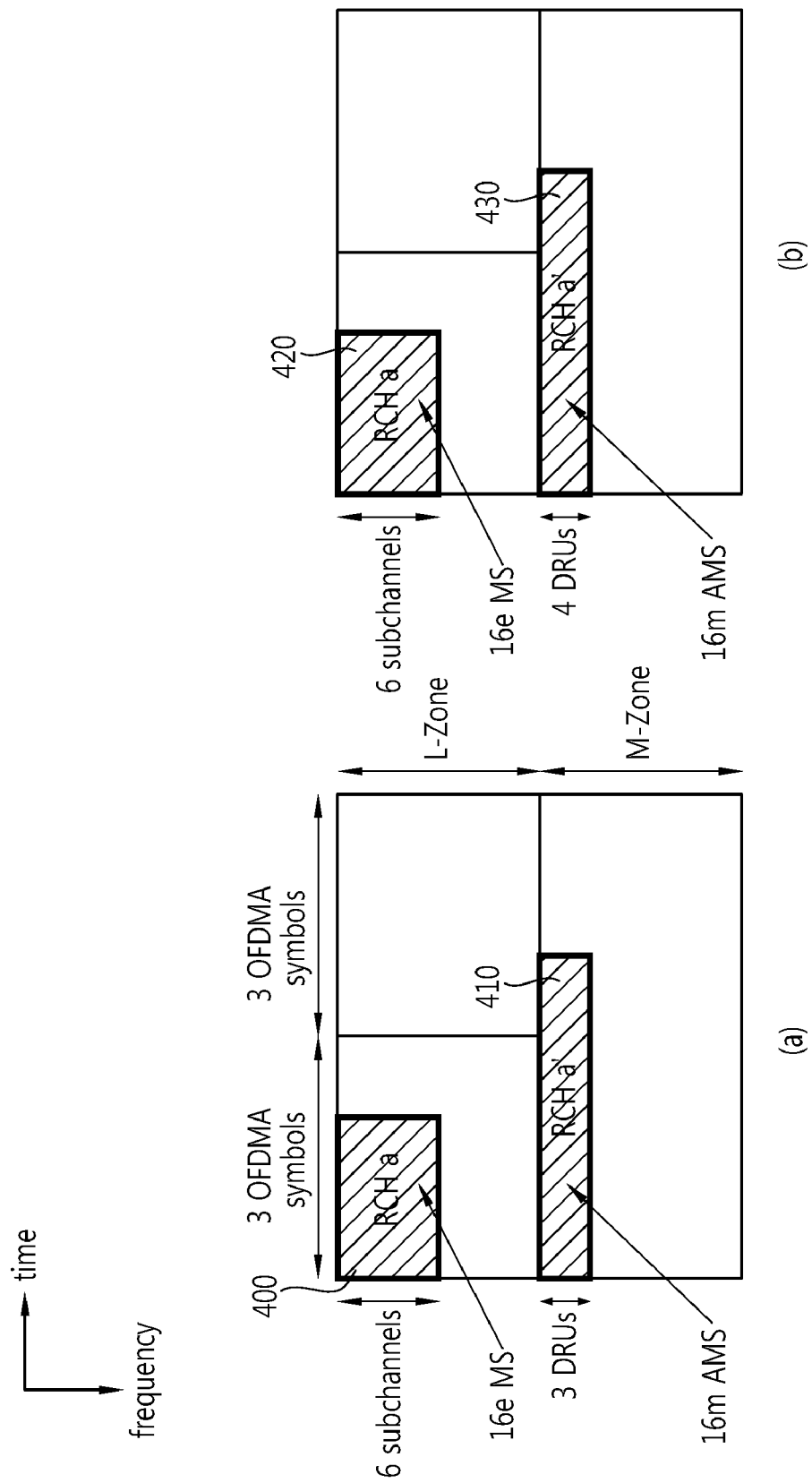

FIG. 15 is another example of a ranging channel structure of legacy support mode according to the proposed method of allocating a ranging channel.

In FIG. 15, the ranging channel structure (i.e., RCH-a) of FIG. 7(a) and the ranging channel structure (i.e., RCH-a') of FIG. 7(b) are respectively allocated to an L-zone and an M-zone. In FIG. 15(a), a first RCH-a 400 is allocated to the L-zone, and a first RCH-a' 410 is allocated to the M-zone. In FIG. 15(b), a second RCH-a 420 is allocated to the L-zone, and a second RCH-a' 430 is allocated to the M-zone. The first RCH-a 400 and the second RCH-a 420 include 6 subchannels in the frequency domain. The first RCH-a' 410 includes 3 DRUs in the frequency domain, and the second RCH-a' 430 includes 4 DRUs in the frequency domain. That is, the ranging channel allocated to the M-zone in FIG. 15 occupies less bandwidth in the frequency domain than the ranging channel allocated to the M-zone in FIGS. 11 to 14. It has been described that in FIG. 15, 3 DRUs or 4 DRUs are included, but the present invention is not limited thereto. Further, in order to maintain the performance of the ranging channel structure including four OFDM symbols of FIG. 7(b), 6 DRUs (144 subcarriers) can be occupied. A 16e MS performs ranging through the first RCH-a 400 or the second RCH-a 420, and a 16m AMS performs ranging through the first RCH-a' 410 or the second RCH-a' 430.

Meanwhile, an MS can transmit the ranging channel in synchronism with the boundary of an UL subframe. Alternatively, an MS can transmit the ranging channel in synchronism with the time which is by an RTG later than the boundary of the end portion of a DL subframe or with the time which is by a TTG earlier than the boundary of the start portion of an UL subframe. In the case in which the MS transmits the ranging channel earlier than the boundary of the UL subframe, the ranging channel has always to be allocated to the first UL subframe of UL subframes.

Figure 16:
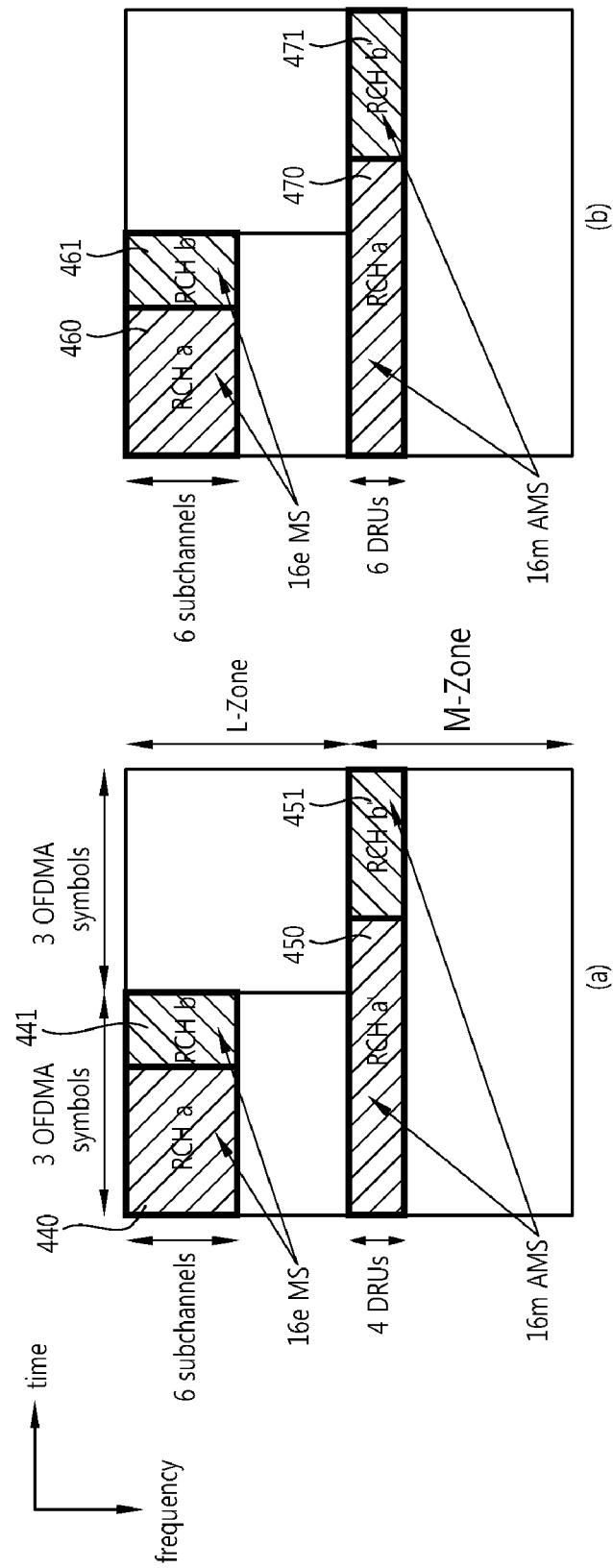

FIG. 16 is another example of a ranging channel structure of the legacy support mode according to the proposed method of allocating a ranging channel.

In FIG. 16, the ranging channel structure (i.e., RCH-a) of FIG. 7(a) and the ranging channel structure (i.e., RCH-b) of FIG. 8(a) are allocated to an L-zone, and the ranging channel structure (i.e., RCH-a') of FIG. 7(b) and the ranging channel structure (i.e., RCH-b') of FIG. 7(a) are allocated to an M-zone. In FIG. 16(a), a first RCH-a 440 and a first RCH-b 441 are contiguously allocated to the L-zone, and a first RCH-a' 450 and a first RCH-b' 451 are contiguously allocated to the M-zone. In FIG. 16(b), a second RCH-a 460 and a second RCH-b 461 are contiguously allocated to the L-zone, and a second RCH-a' 470 and a second RCH-b' 471 are contiguously allocated to the M-zone. The first RCH-a 440 and the first RCH-b 441 of FIG. 16(*a*) or the second RCH-a 460 and the second RCH-b 461 of FIG. 16(*b*) include 6 subchannels in the frequency domain. The first RCH-a' 450 and the first RCH-b' 451 of FIG. 16(*a*) include 4 DRUs in the frequency domain. The second RCH-a' 470 and the second RCH-b' 471 of FIG. 16(*b*) include 6 DRUs in the frequency domain. That is, in FIG. 16, the ranging channel allocated to the M-zone can occupy a bandwidth which is smaller than or equal to that of 6 DRUs. A 16e MS performs ranging through the first RCH-a 440 and the first RCH-b 441 of FIG. 16(*a*) or the second RCH-a 460 and the second RCH-b 461 of FIG. 16(*b*). A 16m AMS performs ranging through the first RCH-a' 450 and the first RCH-b' 451 of FIG. 16(*a*) or the second RCH-a' 470 and the second RCH-b' 471 of FIG. 16(*b*).

In the case in which as described above, the ranging channel structure (i.e., RCH-b) of FIG. 8(*a*) is used, an MS can transmit the ranging channel in synchronization with the boundary of an UL subframe. However, in the case in which the ranging channel structure RCH-a or RCH-a' of FIG. 7(*a*) or 7(*b*) is allocated, an MS can transmit the ranging channel in synchronism with the time which is by an RTG later than the boundary of the end portion of a DL subframe or with the time which is by a TTG earlier than the boundary of the start portion of an UL subframe. If an MS transmits the RCH-a or the RCH-a' earlier than the boundary of an UL subframe, a BS can detect a ranging channel in synchronization with the boundary of an UL subframe using the TTG interval as a virtual ranging cyclic prefix (RCP). Accordingly, although the RCH-b is allocated without a guard time following the RCH-a, ISI can be prevented. However, in the case in which an MS transmits a ranging channel earlier than the boundary of an UL subframe, the ranging channel has always to be allocated to the first UL subframe of UL subframes.

Figure 17:
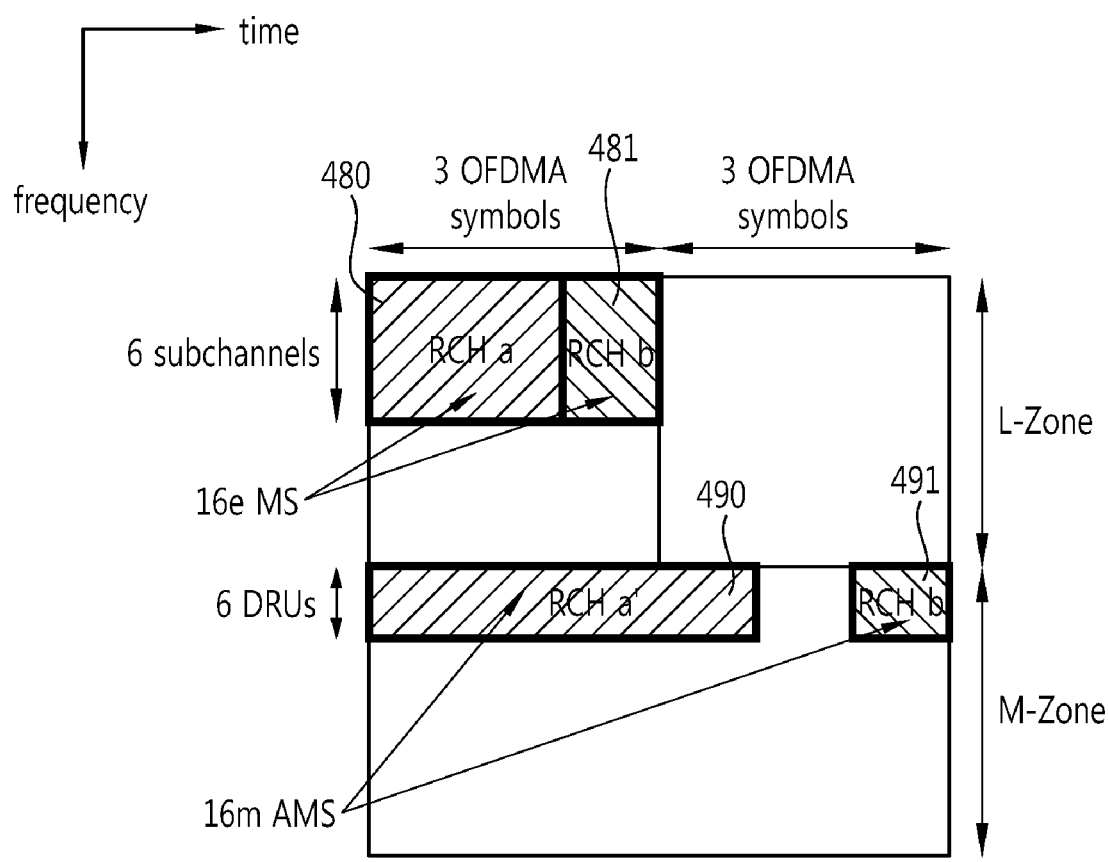

FIG. 17 is another example of a ranging channel structure of the legacy support mode according to the proposed method of allocating a ranging channel.

In FIG. 17, the ranging channel structure (i.e., RCH-a) of FIG. 7(*a*) and the ranging channel structure (i.e., RCH-b) of FIG. 8(*a*) are allocated to an L-zone, and the ranging channel structure (i.e., RCH-a') of FIG. 7(*b*) and the ranging channel structure (i.e., RCH-b) of FIG. 8(*a*) are allocated to an M-zone. In FIG. 17, a first RCH-a 480 and a first RCH-b 481 are contiguously allocated to the L-zone. Further, a first RCH-a' 490 is allocated to the M-zone, one OFDM symbol is then empty, and a second RCH-b 491 is allocated to the M-zone. In this case, in the case in which different kinds of ranging channels are multiplexed in the resource region and MSs out of UL synchronization perform ranging, ISI occurring when a BS receives a plurality of ranging channels can be prevented. The first RCH-a 480 and the first RCH-b 481 include 6 subchannels in the frequency domain. The first RCH-a' 490 and the second RCH-b 491 include 6 DRUs in the frequency domain. The ranging channel allocated to the M-zone can occupy a bandwidth which is equal to or smaller than that of 6 DRUs. A 16e MS performs ranging through the first RCH-a 480 and the first RCH-b 481, and a 16m AMS performs ranging through the first RCH-a' 490 and the second RCH-b 491. An MS can transmit the ranging channel in synchronization with the boundary of an UL subframe. Further, in the RCH-a or the RCH-a', initial access ranging and handover ranging are transmitted in the same position and can be classified into different codes, etc.

In the above embodiments, it has been described that an MS transmits a ranging channel earlier than the boundary of an UL subframe. However, the time when the ranging channel is transmitted can vary according to the position where the ranging channel is allocated a method of allocating the ranging channel. That is, only the RCH-a or the RCH-a' of FIG. 7 can be additionally allocated through the additional allocation or the dynamic allocation of a ranging channel according to an A-MAP. In this case, the RCH-a or the RCH-a' can be allocated to any one of UL subframes. In the case in which only the RCH-a or the RCH-a' is additionally allocated, an RCH-b is not allocated, and the ranging channel can be transmitted in synchronization with the boundary of an UL subframe. Since the RCH-b is not allocated, ISI is not generated.

A method of allocating a ranging channel in the case in which subchannel rotation is applied is described below. If subchannel rotation is applied in the legacy support mode, different physical subcarriers can have the same logical index within six OFDM symbols of an M-zone. That is, although the first three OFDM symbols and the last three OFDM symbol have the same subchannel index within a subframe, they can have different physical subcarriers. Accordingly, there is a method of allocating a ranging channel by taking this into consideration.

Figure 18:
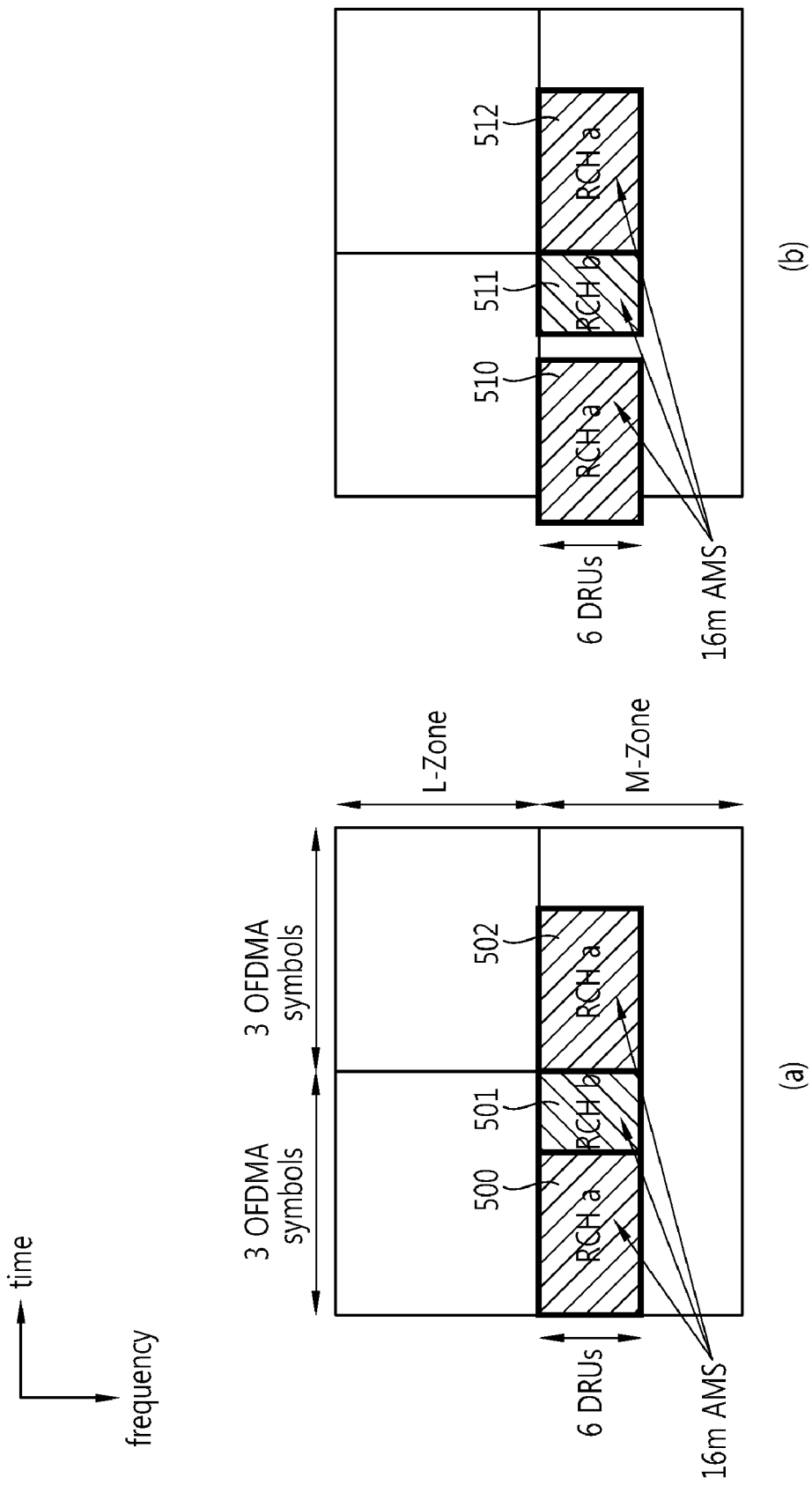

FIG. 18 is another example of a ranging channel structure of the legacy support mode according to the proposed method of allocating a ranging channel.

FIG. 18(*a*) shows a BS's position in which the BS receives a ranging channel, and FIG. 18(*b*) shows an MS' position in which the MS transmits a ranging channel. In FIG. 18, the ranging channel structure (i.e., RCH-a) of FIG. 7(*a*) and the ranging channel structure (i.e., RCH-b) of FIG. 8(*a*) are allocated. A first RCH-a 500, a first RCH-b 501, and a second RCH-a 502 are contiguously allocated to an M-zone.

Each MS is synchronized with DL synchronization and it then obtains UL parameters. The MS transmits the first RCH-a 500 not in synchronization with the boundary of an UL subframe, but in synchronization with the time which is by an RTG later than the boundary of an end portion of a DL subframe or the time which is by a TTG earlier than the boundary of a start portion of the UL subframe. That is, the time when the first RCH-a 500 is actually transmitted is earlier than the boundary of the UL subframe, and the BS can detect a ranging channel in synchronization with the boundary of the UL subframe using the TTG interval as a virtual RCP. Accordingly, although the RCH-b is allocated without a guard time following the RCH-a, ISI can be prevented. However, when the second RCH-a 502 is transmitted earlier than the boundary of the UL subframe, interference is generated because actually used subcarriers are changed according to subchannel rotation. Accordingly, the transmission of the second RCH-a 502 subsequent to the first RCH-b 501 should be synchronized with the boundary of the UL subframe. However, if an MS transmits a ranging channel earlier than the boundary of the UL subframe, the ranging channel has always to be allocated to the first UL subframe of UL subframes.

In the above embodiments, the ranging channel structure of the legacy support mode according to the proposed method of allocating a ranging channel has been described assuming that subchannel rotation is applied, but the present invention is not limited thereto. That is, although subchannel rotation is not applied, the ranging channel structure of FIG. 18 can be used. Further, it has been described that an MS transmits a ranging channel earlier than the boundary of an UL frame. However, the time when the ranging channel is transmitted can be varied according to the position where the ranging channel is allocated or a method of allocating the ranging channel. That is, only the RCH-a or the RCH-a' of FIG. 7 can be allocated through the additional allocation or the dynamic allocation of a ranging channel according to an A-MAP. In this case, the RCH-a or the RCH-a' can be allocated to any one of UL subframes. If only the RCH-a or the RCH-a' is additionally allocated, the RCH-b is not allocated, and the ranging channel can be transmitted in synchronization with the boundary of an UL frame. Further, ISI is not generated because the RCH-b is not allocated.

Furthermore, in the above embodiments, a bandwidth request channel has been described for convenience sake without distinguishing from a ranging channel. However, the bandwidth request channel and the ranging channel can be distinguished each other.

Figure 19:
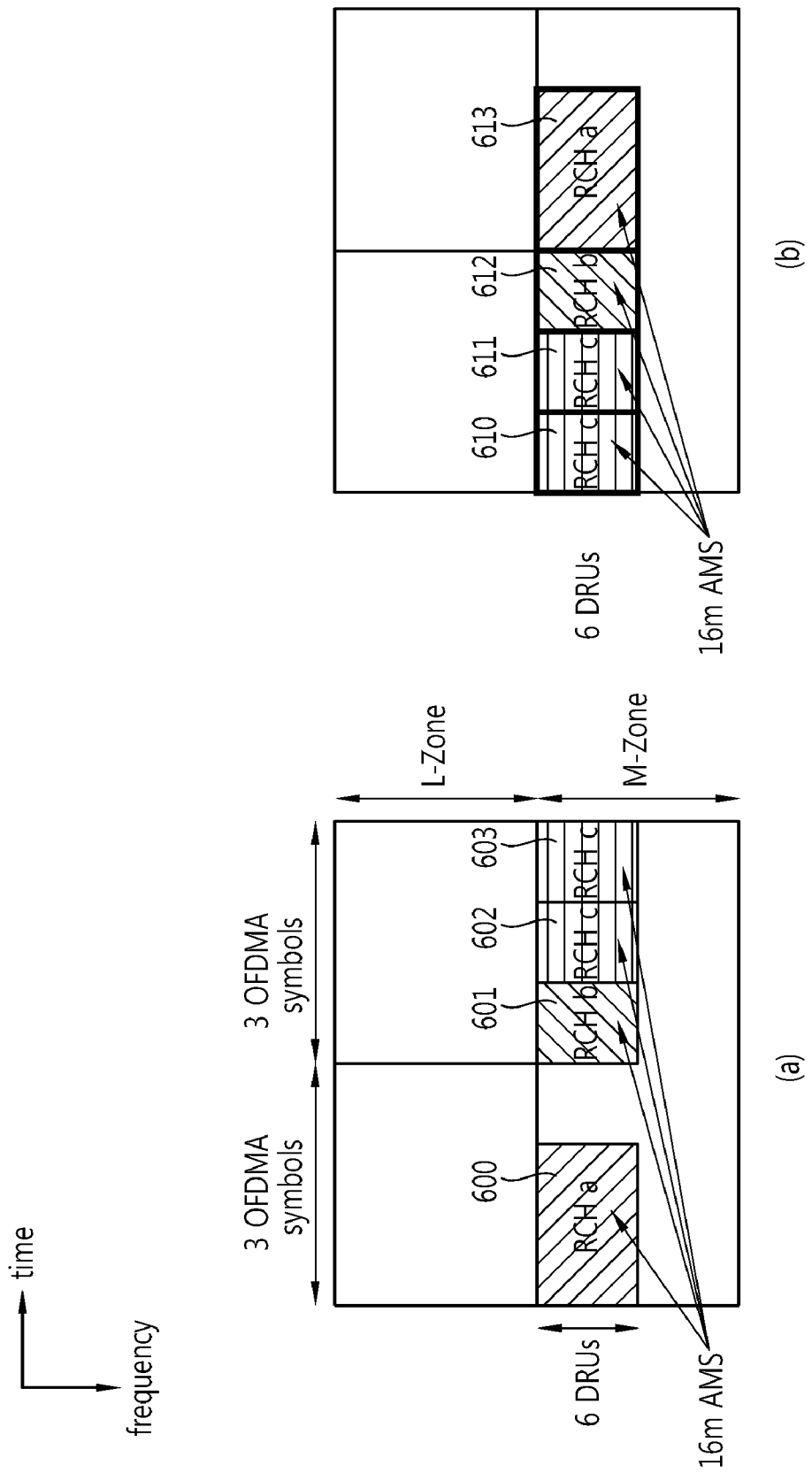

FIG. 19 is another example of a ranging channel structure of the legacy support mode according to the proposed method of allocating a ranging channel.

In FIG. 19(a), first two OFDM symbols are allocated to an RCH-a 600 for initial access ranging or handover ranging. A third OFDM symbol is used as a guard time for preventing ISI. A fourth OFDM symbol is used as an RCH-b 601 for periodic ranging. Fifth and sixth OFDM symbols are allocated to a first RCH-c 602 and a second RCH-c 603, respectively, for a bandwidth request. All the RCH-a, the RCH-b, the first RCH-c, and the second RCH-c can be transmitted in synchronization with the boundary of an UL subframe. In FIG. 19(b), first and second OFDM symbols are allocated to a first RCH-c 610 and a second RCH-c 611, respectively, for a bandwidth request. A third OFDM symbol is used to an RCH-b 612 for periodic ranging. Fourth and fifth OFDM symbols are allocated to an RCH-a 613 for initial access ranging or handover ranging. The ranging channel and the bandwidth request channel can be multiplexed in various ways.

Figure 20:
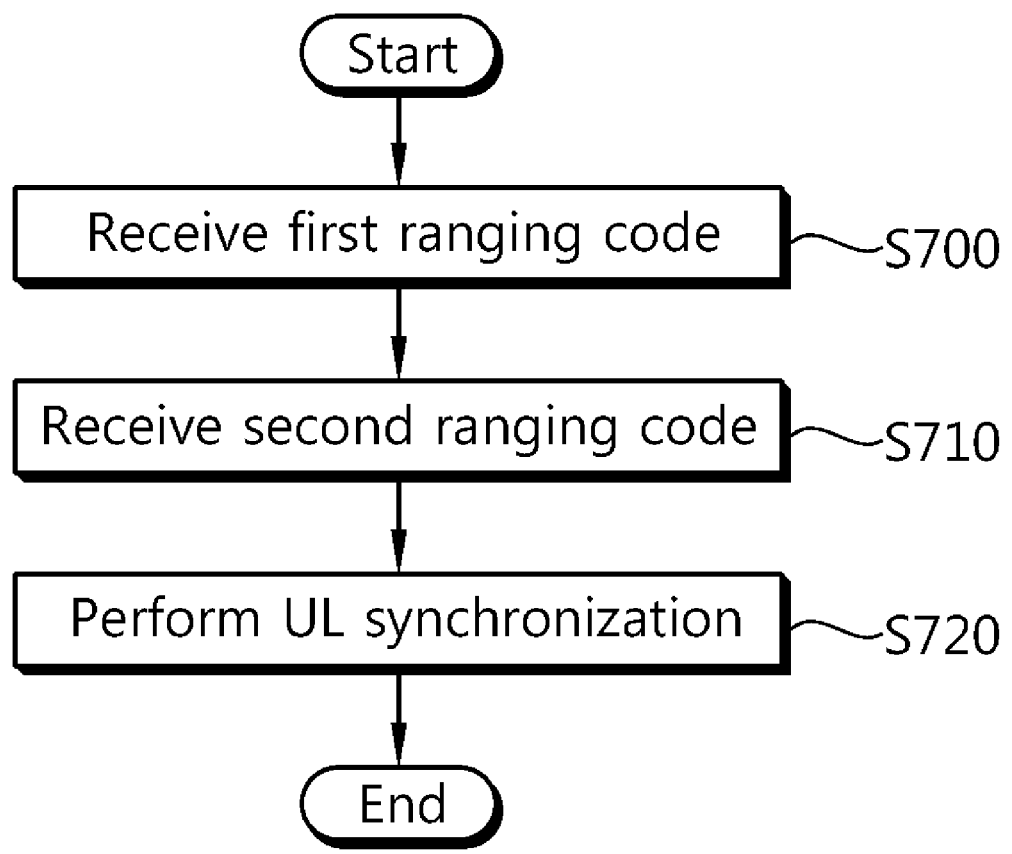
FIG. 20 shows a proposed uplink synchronization method according to an embodiment.

FIG. 20 shows a proposed uplink synchronization method according to an embodiment.

At step S700, a BS receives a first ranging code from a first MS through at least one first ranging channel in a ranging subframe. At step S710, the BS receives a second ranging code from a second MS through at least one second ranging channel in the ranging subframe. At step S720, the BS performs uplink synchronizations for the first MS and the second MS using the first ranging code and the second ranging code, respectively. Here, the at least one first ranging channel and the at least one second ranging channel can be allocated with a guard time, including at least one OFDM symbol, interposed therebetween. The at least one first ranging channel can be any one of an initial access ranging channel and a handover ranging channel, and the at least one second ranging channel can be a periodic ranging channel.

Figure 21:
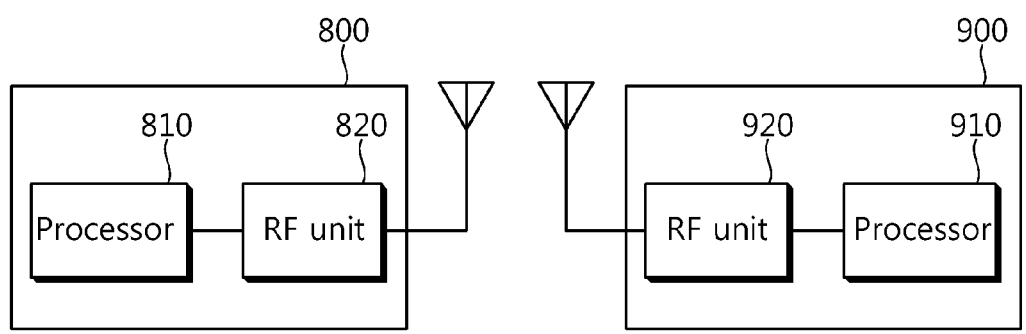
FIG. 21 is a block diagram showing a BS and an MS in which the embodiments of the present invention are implemented.

FIG. 21 is a block diagram showing a BS and an MS in which the embodiments of the present invention are implemented.

The BS 800 includes a processor 810 and a radio frequency (RF) unit 820. The processor allocates at least one first ranging channel, having a first structure, and at least one second ranging channel, having a second structure, to a ranging subframe. The RF unit 820 is connected to the processor 810 and configured to receive a ranging code from at least one MS through the at least one first ranging channel or the at least one second ranging channel in a ranging subframe. Here, the at least one first ranging channel and the at least one second ranging channel can be allocated with a guard time, including at least one OFDM symbol, interposed therebetween. The ranging channels of FIGS. 11 to 19 can be configured in various ways by the BS 800 of FIG. 21.

The MS 900 includes a processor 910 and an RF unit 920. The processor 910 processes ranging codes. The RF unit 920 is connected to the processor 910 and configured to transmit the ranging codes to a BS.

In the legacy support mode, various kinds of ranging channels can be allocated with minimum overhead.

The present invention can be implemented using hardware, software, or a combination of them. In the hardware implementations, the present invention can be implemented using an application specific integrated circuit (ASIC), a digital signal processor (DSP), a programmable logic device (PLD), a field programmable gate array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of allocating a ranging channel in a wireless communication system, the method comprising:
    allocating at least one first ranging channel, having a first structure, and at least one second ranging channel, having a second structure, to a ranging subframe,
    wherein a number of orthogonal frequency division multiplexing (OFDM) symbols included in the first structure and a number of OFDM symbols included in the second structure differs from each other, and
    a guard time including at least one OFDM symbol is allocated between the at least one first ranging channel and the at least one second ranging channel.

2. The method of claim 1, wherein the first structure includes two contiguous OFDM symbols.

3. The method of claim 2, wherein an identical ranging code is transmitted in the two contiguous OFDM symbols.

4. The method of claim 1, wherein the second structure includes one OFDM symbol.

5. The method of claim 1, wherein the at least one first ranging channel is allocated to first to fourth OFDM symbols of the ranging subframe.

6. The method of claim 1, wherein the at least one second ranging channel is allocated to a last OFDM symbol of the ranging subframe.

7. The method of claim 1, further comprising a mobile station (MS) transmitting a ranging code to a base station (BS) through one of the at least one first ranging channel and the at least one second ranging channel.

8. The method of claim 7, wherein the ranging code is transmitted through the at least one first ranging channel, and
the ranging code is one of an initial ranging code for initial network entry and association and a handover ranging code for ranging for a target BS during handover.

9. The method of claim 7, wherein the ranging code is transmitted through the at least one second ranging channel, and
the ranging code is for periodic ranging.

10. The method of claim 1, wherein the at least one first ranging channel or the at least one second ranging channel includes six distributed resource units (DRUs) in the frequency domain.

11. The method of claim 1, wherein the ranging subframe includes six OFDM symbols in the time domain.

12. An apparatus for allocating a ranging channel in a wireless communication system, the apparatus comprises:
a processor configured to allocate at least one first ranging channel, having a first structure, and at least one second ranging channel, having a second structure, to a ranging subframe; and
a radio frequency (RF) unit connected to the processor and configured to transmit a radio signal,
wherein a number of orthogonal frequency division multiplexing (OFDM) symbols included in the first structure and a number of OFDM symbols included in the second structure differs from each other, and
a guard time including at least one OFDM symbol is allocated between the at least one first ranging channel and the at least one second ranging channel.

13. The apparatus of claim 12, wherein the first structure includes two contiguous OFDM symbols.

14. The apparatus of claim 12, wherein the second structure includes one OFDM symbol.

15. The apparatus of claim 12, wherein the at least one first ranging channel is allocated to first to fourth OFDM symbols of the ranging subframe.

16. The apparatus of claim 12, wherein the at least one second ranging channel is allocated to a last OFDM symbol of the ranging subframe.

17. An uplink synchronization method in a wireless communication system, the method comprising:
receiving a first ranging code from a first MS through at least one first ranging channel in a ranging subframe;
receiving a second ranging code from a second MS through at least one second ranging channel in the ranging subframe; and
performing uplink synchronization for each of the first MS and the second MS using the first ranging code and the second ranging code,
wherein a guard time including at least one OFDM symbol is allocated between the at least one first ranging channel and the at least one second ranging channel.

18. The uplink synchronization method of claim 17, wherein the first structure includes two contiguous OFDM symbols.

19. The uplink synchronization method of claim 17, wherein the second structure includes one OFDM symbol.

* * * * *